US010275945B2

(12) United States Patent
Lee et al.

(10) Patent No.: US 10,275,945 B2
(45) Date of Patent: Apr. 30, 2019

(54) MEASURING DIMENSION OF OBJECT THROUGH VISUAL ODOMETRY

(71) Applicant: GOOGLE LLC, Mountain View, CA (US)

(72) Inventors: Johnny Chung Lee, Sunnyvale, CA (US); Joel Hesch, Sunnyvale, CA (US); Ryan Hickman, Sunnyvale, CA (US); Patrick Mihelich, Sunnyvale, CA (US); James Fung, Sunnyvale, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 15/664,754

(22) Filed: Jul. 31, 2017

(65) Prior Publication Data
US 2017/0358142 A1 Dec. 14, 2017

Related U.S. Application Data

(63) Continuation of application No. 14/588,515, filed on Jan. 2, 2015, now abandoned.

(60) Provisional application No. 61/923,629, filed on Jan. 3, 2014.

(51) Int. Cl.
*G09G 5/00* (2006.01)
*G06T 19/00* (2011.01)
*H04L 29/06* (2006.01)
*H04W 4/02* (2018.01)
*H04W 4/04* (2009.01)
*H04L 29/08* (2006.01)

(52) U.S. Cl.
CPC ............ *G06T 19/006* (2013.01); *H04L 67/18* (2013.01); *H04L 67/38* (2013.01); *H04W 4/026* (2013.01); *H04W 4/043* (2013.01); *G06T 2210/04* (2013.01)

(58) Field of Classification Search
CPC ....... G06T 19/006; G06T 19/00; G06F 3/011; G06F 3/012; G02B 27/017
USPC ........................................................ 345/633
See application file for complete search history.

(56) References Cited

U.S. PATENT DOCUMENTS

| 5,477,622 | A | * | 12/1995 | Skalnik | ................... | G01B 3/12 33/1 V |
| 6,519,550 | B1 | * | 2/2003 | D'Hooge | ............. | G01B 11/002 340/5.8 |
| 9,129,404 | B1 | * | 9/2015 | Wagner | ................. | G06Q 30/00 |
| 9,170,318 | B1 | * | 10/2015 | Bozarth | ............... | H04W 64/00 |
| 2009/0244097 | A1 | | 10/2009 | Estevez | | |
| 2013/0307874 | A1 | | 11/2013 | Blanchflower et al. | | |

(Continued)

*Primary Examiner* — Gordon G Liu

(57) ABSTRACT

An electronic device includes at least one sensor, a display, and a processor. The processor is configured to determine a dimension of a physical object along an axis based on a change in position of the electronic device when the electronic device is moved from a first end of the physical object along the axis to a second end of the physical object along the axis. A method includes capturing and displaying imagery of a physical object at an electronic device, and receiving user input identifying at least two points of the physical object in the displayed imagery. The method further includes determining, at the electronic device, at least one dimensional aspect of the physical object based on the at least two points of the physical object using a three-dimensional mapping of the physical object.

28 Claims, 14 Drawing Sheets

(56) References Cited

U.S. PATENT DOCUMENTS

| | | | |
|---|---|---|---|
| 2014/0023996 A1* | 1/2014 | Finn | G09B 25/00 |
| | | | 434/72 |
| 2014/0100813 A1* | 4/2014 | Showering | G01B 21/02 |
| | | | 702/141 |
| 2014/0240469 A1 | 8/2014 | Lee | |
| 2015/0356788 A1 | 12/2015 | Abe et al. | |

* cited by examiner

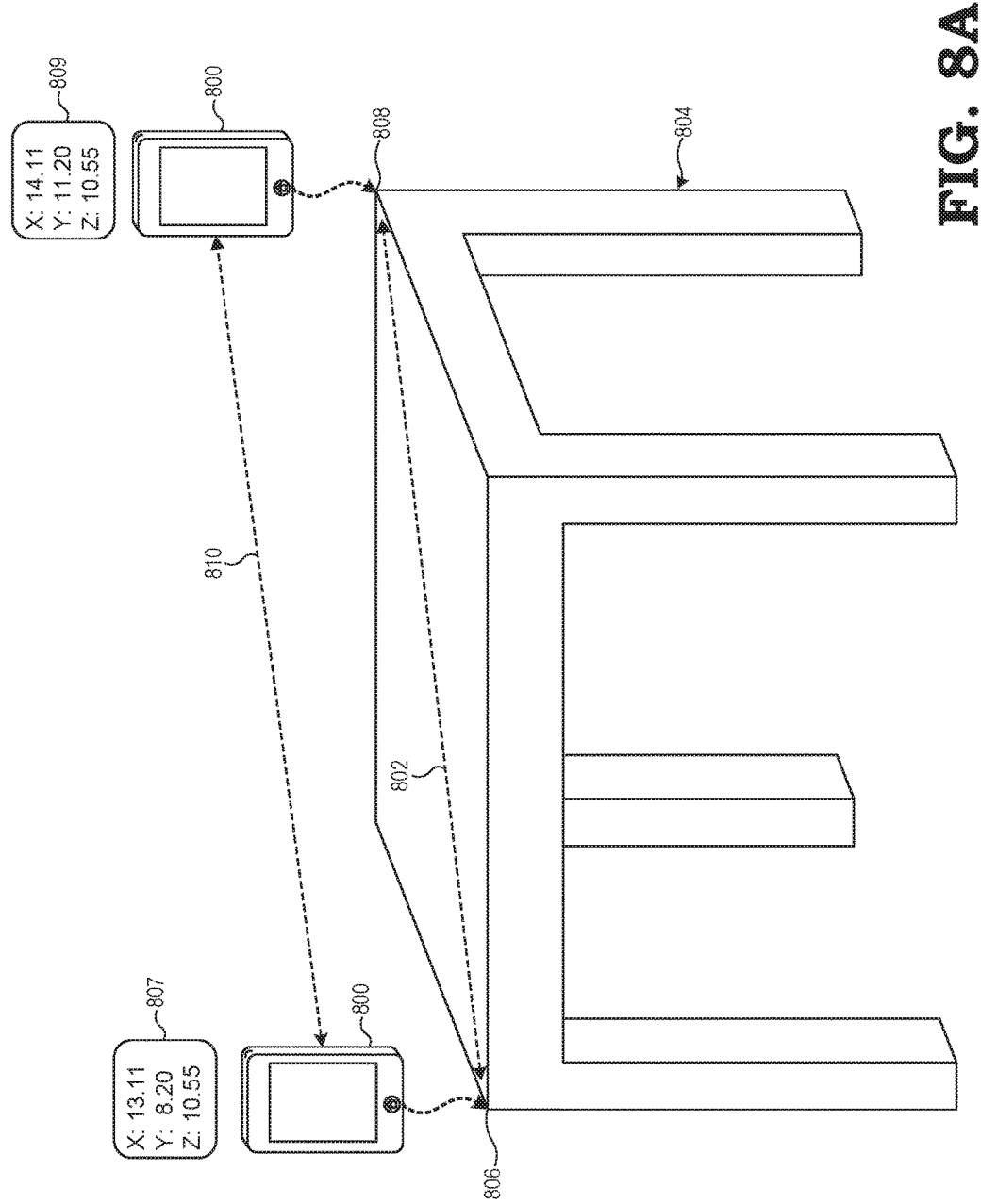

MEASURING DIMENSION OF OBJECT THROUGH VISUAL ODOMETRY

CROSS-REFERENCE TO RELATED APPLICATIONS

The present application is a continuation application of U.S. patent application Ser. No. 14/588,515, entitled "Augmented Reality Overlays using Position and Orientation to Facilitate Interactions Between Electronic Devices" and filed on Jan. 2, 2015, and which claims priority to U.S. patent application Ser. No. 61/923,629, entitled "Electronic Device Using Position and Orientation to Facilitate Location-Based Services" and filed on 3 Jan. 2014, the entireties of which are incorporated by reference herein.

FIELD OF THE INVENTION

The present application generally relates to the use of augmented reality overlays in electronic devices and, more particularly, to the use of three-dimensional mapping to facilitate location-based augmented reality overlays in electronic devices.

BACKGROUND

Computing-enabled cellular phones, tablet computers, and other portable electronic devices increasing incorporate location-based services to provide enhanced user-machine interactions. Conventionally, these location-based services rely on a static and unrealistic representation of the local environment of the portable electronic device, and thus often lead to user dissatisfaction.

BRIEF DESCRIPTION OF THE DRAWINGS

The present disclosure may be better understood by, and its numerous features and advantages made apparent to, those skilled in the art by referencing the accompanying drawings. The use of the same reference symbols in different drawings indicates similar or identical items.

FIG. 8A is a diagram illustrating an example of measuring a dimension of an object using a change in position of an electronic device in accordance with at least one embodiment of the present disclosure.

DETAILED DESCRIPTION OF EMBODIMENTS

FIGS. 1-13 illustrate various techniques for leveraging the position and orientation tracking capabilities of an electronic device, along with depth information and other 3D mapping information available to the electronic device, to provide enhanced location-based services. These location-based services may take the form of enhanced augmented reality (AR) functionality that formats or otherwise controls graphical information presented in an AR overlay so as to be visually compatible with the geometries of the objects within a local environment, or to effectively convey related position/orientation information. These location-based services further may take the form of virtual reality (VR) functionality that maps the position and orientation of an electronic device in the local environment to corresponding perspective views of a remote environment or virtual environment. The capture of imagery of the local environment by the electronic device in support of this functionality may utilize any of a variety of techniques, examples of which are disclosed in U.S. patent application Ser. No. 14/040,918 (Client Ref. No. CS41630), filed on Sep. 30, 2013 and entitled "3D Feature Descriptors with Camera Pose Information", and U.S. patent application Ser. No. 14/086,427 (Client Ref. No. CS41623), filed on Nov. 21, 2013 and entitled "Electronic Device with Modulated Light Flash Operation for Rolling Shutter Image Sensor," the entireties of which are incorporated by reference herein.

Figure 1:
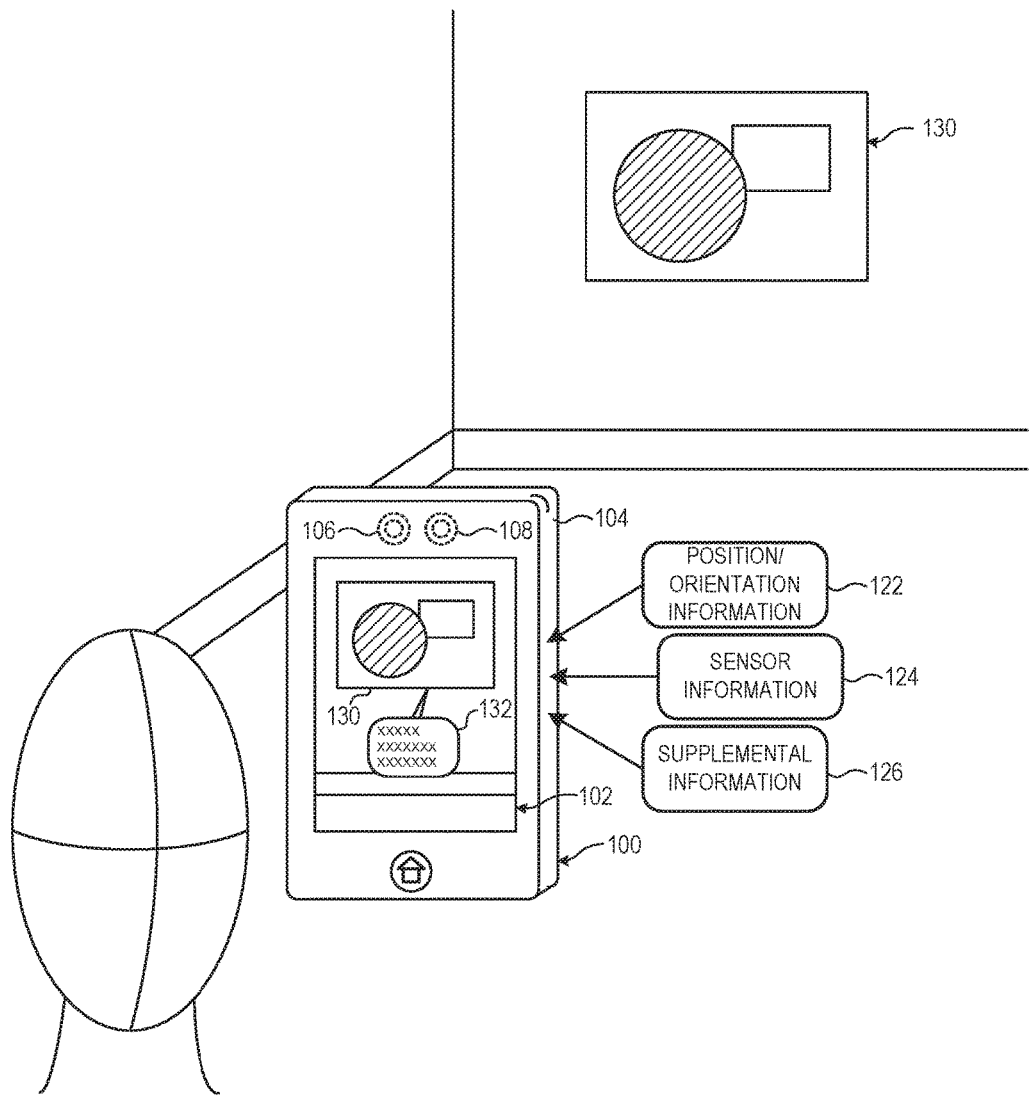
FIG. 1 is a diagram illustrating an electronic device utilizing position and orientation information to facilitate location-based services in accordance with at least one embodiment of the present disclosure.

FIG. 1 illustrates an electronic device 100 configured to support location-based functionality, such as simultaneous location and mapping (SLAM), visual odometry, augmented reality (AR), and virtual reality (VR) techniques, using image and non-image sensor data in accordance with at least one embodiment of the present disclosure. The electronic device 100 can include a portable user device, such as a tablet computer, computing-enabled cellular phone (e.g., a "smartphone"), a notebook computer, a personal digital assistant (PDA), a gaming system remote, a television remote, and the like. In other embodiments, the electronic device 100 can include a fixture device, such as medical imaging equipment, a security imaging camera system, an industrial robot control system, a drone control system, and the like. For ease of illustration, the electronic device 100 is generally described herein in the example context of a portable user device, such as a tablet computer or a smartphone; however, the electronic device 100 is not limited to these example implementations.

The electronic device 100 includes a housing 102 containing or otherwise incorporating a display 104 and a plurality of sensors to obtain information regarding a local environment of the electronic device 100. These sensors can include image-based sensors, such as imaging cameras 106, 108 to obtain visual information (imagery) for the local environment in the form of pictures or video. These sensors also may include non-image-based sensors, such as Global Positioning System (GPS) receivers, wireless interfaces (e.g., IEEE 802.11 transceivers or Bluetooth™ receivers), accelerometers, gyroscopes, magnetometers, ambient light sensors, and the like.

In at least one embodiment, the electronic device 100 uses the information generated by some or all of these sensors to determine one or both of a position and orientation of the electronic device 100 in support of various location-based services available via the electronic device 100. This position and orientation (referred to herein in the alternative or collective as "position/orientation" or "pose") may be an absolute position/orientation (e.g., a GPS coordinate and compass orientation) or a relative position/orientation (that is, relative to the local environment), or a combination thereof. To illustrate, a magnetometer, gyroscope, and accelerometer may be used to determine a relative position (or change in position) and orientation (relative to gravity), and a GPS sensor may be used to provide an absolute position. Similarly, SLAM or other visual odometry methods may be used to provide a position and orientation relative to a specified location or within a specified facility or map. Moreover, in at least one embodiment, the electronic device 100 uses imagery from the local environment to support object recognition functionality.

To illustrate, in some embodiments, the electronic device 100 incorporates depth sensing via a depth sensor in order to determine its distance from various objects in the local environment, whereby this information may be used for visual telemetry purposes or for identifying the objects. In some instances, this depth sensor may be implemented by positioning and orienting the imaging cameras 106, 108 such that their fields of view overlap starting at a specified distance from the electronic device 100, thereby enabling depth sensing of objects in the local environment that are positioned in the region of overlapping fields of view via multiview image analysis. In other implementations, the electronic device 100 implements the depth sensor in the form of a structured light projector (not shown in FIG. 1) to project modulated light patterns into the local environment, and one or both of imaging cameras 106 and 108 to capture reflections of the modulated light patterns as they reflect back from objects in the local environment. These modulated light patterns can be either spatially-modulated light patterns or temporally-modulated light patterns. The captured reflections of the modulated light patterns are referred to herein as "depth imagery." The depth sensor then may calculate the depths of the objects, that is, the distances of the objects from the electronic device 100, based on the analysis of the depth imagery. The resulting depth information obtained from the depth sensor may be used to calibrate or otherwise augment depth information obtained from multiview analysis (e.g., stereoscopic analysis) of the image data captured by the imaging cameras 106, 108.

Alternatively, the depth information from the depth sensor may be used in place of depth information obtained from multiview analysis. To illustrate, multiview analysis typically is better suited for bright lighting conditions and when the objects are relatively distant, whereas modulated light-based depth sensing is better suited for lower light conditions or when the observed objects are relatively close (e.g., within 4-5 meters). Thus, when the electronic device 100 senses that it is outdoors or otherwise in relatively good lighting conditions, the electronic device 100 may elect to use multiview analysis to determine object depths. Conversely, when the electronic device 100 senses that it is indoors or otherwise in relatively poor lighting conditions, the electronic device 100 may switch to using modulated light-based depth sensing via the depth sensor.

Position/orientation information 122 and other sensor information 124 obtained by the electronic device 100 can be used to support any of a variety of location-based functionality, such as visual odometry or other SLAM functionality, augmented reality (AR) functionality, virtual reality (VR) functionality, and the like. As an example, the electronic device 100 can 3D map the local environment and then use this mapping to facilitate the user's navigation through the local environment, such as by displaying to the user a floor plan generated from the mapping information and an indicator of the user's current location relative to the floor plan as determined from the current relative position of the electronic device 100. Moreover, the relative position/ orientation information 122 obtained by the electronic device 100 can be combined with supplemental information 126 to present an AR view of the local environment to a user via the display 104 of the electronic device 100. This supplemental information 126 can include one or more AR databases locally stored at the electronic device 100 or remotely accessible by the electronic device 100 from a cloud service or other remote processing system via a wired or wireless network.

To illustrate, in the depicted example of FIG. 1, the local environment is a museum of art, and the electronic device 100 is in communication with a remote server or other cloud service that maintains a database of information regarding the artwork currently on display in the museum (one example of supplemental information 126). This database identifies the corresponding artwork based on relative locations within the museum. Accordingly, the electronic device 100 can determine a relative orientation/position of the electronic device 100 as described above and herein, and from this relative orientation/position determine the identity of artwork 130 captured by the imaging cameras 106, 108 based on the point of view of the imaging cameras 106, 108 while in this orientation/position. With the artwork 130 so identified, the electronic device 100 can query the database to determine information regarding the artwork 130, and provide a graphical representation of this information as a graphical overlay 132 associated with the depiction of the artwork 130 on the display 104 of the electronic device 100.

As another example, the position/orientation of the electronic device 100 may be used to control the user's interactions with systems in the local environment. To illustrate, the user may speak the voice command "lower temperature" into the electronic device 100 while standing in the user's living room. In response, the electronic device 100 sends its current position and the command "lower temperature" to a home automation system in communication with the electronic device 100, and the home automations system, using the position information, lowers the temperature in the living room in response to the command. In a similar vein, the user may tap the electronic device 100 against a lamp in the living room, and the home automation system may detect this motion, identify the lamp as being the closest object to the electronic device 100, and thus turn on the lamp in response.

Additional examples of location-based services utilizing one or more of the position/orientation information 122 and other sensor information obtained by the various sensors of the electronic device 100, in combination with supplemental information 126, are described in detail below with reference to FIGS. 3-13.

Figure 2:
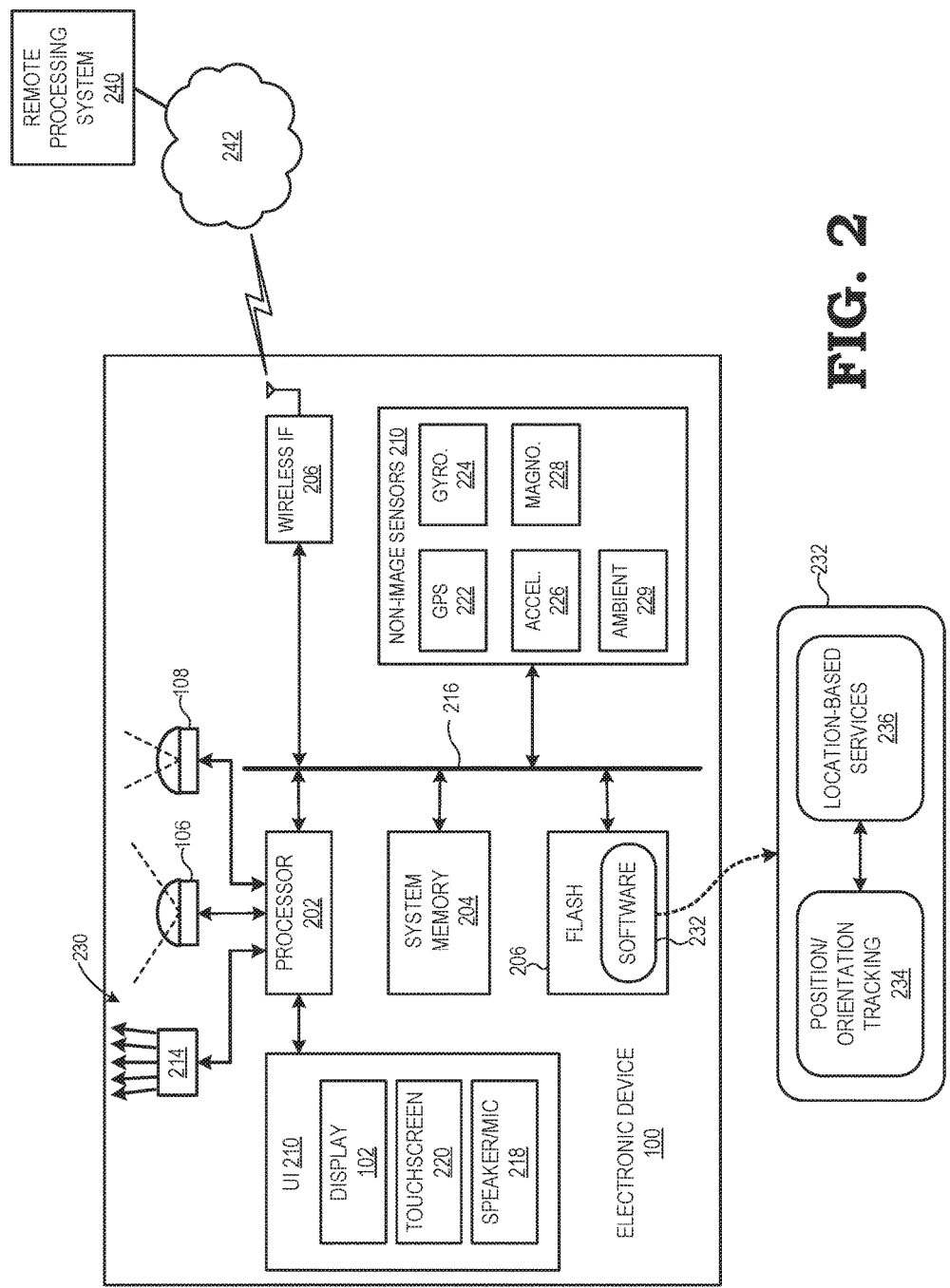
FIG. 2 is a diagram illustrating an example system implementation of the electronic device of FIG. 1 in accordance with at least one embodiment of the present disclosure.

FIG. 2 illustrates an example implementation of the electronic device 100 in accordance with at least one embodiment of the present disclosure. In the depicted example, the electronic device 100 includes the imaging cameras 106, 108, at least one processor 202 (e.g., a central processing device (CPU)), one or more non-transitory computer readable storage media, such as system memory 204, flash memory 206, or another storage device (e.g., optical or magnetic disc drive, solid state hard drive, etc.), a wireless network interface 208 (e.g., a wireless local area network (WAN) interface, a cellular data network interface, etc.), a user interface (UI) 210, a set 212 of non-image sensors, and a structured light projector 214 interconnected via one or more busses 216 or other interconnects. The UI 210 includes, for example, the display 104, a speaker or microphone 218, a keypad or touchscreen 220, as well as other input/output components to receive input from, or provide information to, a user. The set 212 of non-image sensors can include any of a variety and combination of non-image sensors used to provide non-image context or state of the electronic device 100, such as a GPS receiver 222, a gyroscope 24, an accelerometer 226, a magnetometer 228, and an ambient light sensor 229.

In the depicted example, the imaging camera 106 comprises a wide-angle imaging camera and the imaging camera 108 comprises a narrow-angle imaging camera. Thus the imaging cameras 106, 108 may be used to capture user-viewable imagery of the local environment, as well as to provide depth information using multiview analysis in certain conditions (e.g., high ambient light conditions). In other conditions (e.g., low ambient light conditions), depth information may be captured by a depth sensor 230 formed from a combination of the modulated light projector 214 and one or both of the imaging cameras 106, 108. In this operation, the modulated light projector 214 projects modulated light patterns into the local environment, and uses one or both of imaging cameras 106, 108 to capture reflections of the modulated light patterns as they reflect back from objects in the local environment. These modulated light patterns can be either spatially-modulated light patterns or temporally-modulated light patterns. The projection of a modulated light pattern is referred to herein as a "modulated light flash" and the captured reflections of a modulated light flash are referred to herein as "depth images" or "depth imagery." The depth sensor 230 then may calculate the depths of the objects, that is, the distances of the objects from the electronic device 100, based on the analysis of the depth imagery.

In operation, the one or more processors 202 execute one or more software applications 232 representing a set of executable instructions stored at a computer readable storage medium, such as the system memory 204 or flash memory 206. The executable instructions of the software application 232, when executed, manipulate the one or more processors 202 to perform various software-based functionality to implement at least a portion of the techniques described herein, provide visual information via the display 104, respond to user input via the UI 210 and the like.

In the illustrated example, the software application 232 implements two modules: a position/orientation tracking module 234; and a location-based services module 236. The position/orientation tracking module 234 operates to track the position/orientation of the electronic device 100 via SLAM or visual telemetry techniques using the depth sensor 230 and the imaging cameras 106, 108, via the set 212 of non-image sensors (e.g., GPS location tracking via the GPS receiver 222 and orientation tracking via the gyroscope 224, accelerometer 226, and magnetometer 228), or a combination thereof. The location-based services module 236 uses the position/orientation tracking information to provide one or more location-based services to the user via the electronic device 100, examples of which are described in detail below. In providing these location-based services, the location-based services module 236 may make use of supplemental information 126 (FIG. 1) obtained from one or more local or remote databases. To illustrate, the location-based services module 236 may maintain a local datastore of previous waypoints of the electronic device 100 and imagery captured at each waypoint in order to provide an AR overlay in the imagery (video) displayed at the display 104. Further, the electronic device 100 may access a cloud service or other remote processing system 240 via one or more networks 242 (e.g., a local area network, wide area network, or the internet) to obtain supplemental information for a provided service, such as AR overlay information, VR imagery, location information for other devices, and the like.

Figure 3:
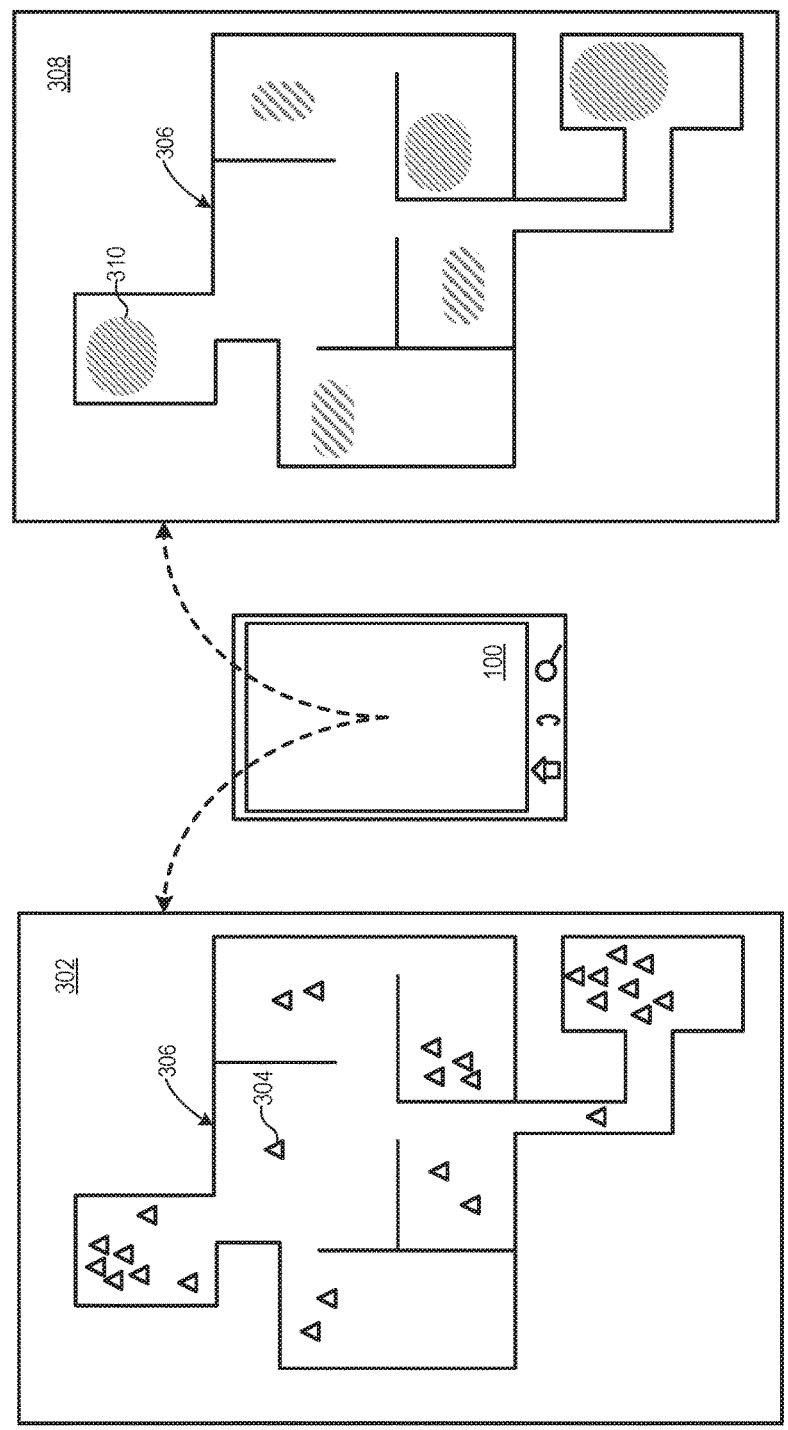
FIG. 3 is a diagram illustrating provision of a density map of electronic devices in a facility or other location in accordance with at least one embodiment of the present disclosure.

FIG. 3 illustrates an example implementation of a location-based service to provide density mapping of electronic devices at a facility or other location in accordance with at least one embodiment. In this implementation, the locations of portable electronic devices, such as smart phones, tablets, and smart watches, at a facility or other area are monitored by the devices themselves or by a remote system, and a density map is generated from the current locations of the portable electronic devices. In some embodiments, the density map may take the form of individualized density map 302, whereby the location of each monitored portable electronic device within a facility is separately indicated by a corresponding icon 304 within a floorplan 306, map, or other spatial representation of the facility or area. In other embodiments the density map may take the form of non-individualized density map 308, whereby an indication of a number of devices within a given area, or density of devices, is represented via shading 310, coloring, or other visual indicia within the floorplan 306 or other spatial representation of the facility or area, and such that the location of any particular electronic device is not readily discerned from the non-individualized density map 308. As depicted by the non-individualized density map 308, a filter may be implemented so that device densities below a certain threshold are omitted from inclusion in the density map.

The individualized density map 302 may be utilized when the location of the portable electronic device is sufficiently granular. To illustrate, each participating portable electronic device within the facility may use a software application or operating system (OS) feature that tracks and reports the position/orientation of the electronic device within ten centimeters using SLAM, visual odometry, or readings from the GPS sensor 222 (FIG. 2) and the gyroscope 224 (FIG. 2) and periodically reports the current position/orientation of the electronic device to a remote processing system via, e.g., a wireless connection. From this, the remote processing system may then collate the current positions/orientations of the reporting electronic devices and generate the density map 302 for the corresponding point in time.

The non-individualized density map 308 may be utilized when there is insufficient location accuracy to accurately report the locations of the participating electronic devices, or in the event that privacy or security concerns preclude the identification of the specific location of any particular electronic device. To illustrate, the facility may provide wireless network access to the electronic devices via a set of access points distributed through the facility in known locations and with known or estimated coverage areas, and a cloud service may make use of the number or frequency (or "density") of queries to an access point by the electronic devices as an indicator of the number, or density, of electronic devices within the coverage area of that access point. From this information, the cloud service can then construct the non-individualized density map 308 with each coverage area colored or shaded according to its current device query "density."

As the density map illustrates the number, or density, of electronic devices within areas of a facility or other location, the density map implies the popularity of each particular area among the device users, and thus can serve as a powerful analytical tool. To illustrate, the density map can be used to support retail analytics, such as determining where to post sales associates on the floor of a retail shop at any given time based on the density and distribution of customers depicted in the density map. Security operations likewise can identify where to focus security personnel within a facility based on the density map. Similarly, a building manager can identify where to most optimally activate heating-ventilation-air-conditioning (HVAC) equipment within a building based on a current density map. Further, changes in the density map over time, such as density flow within a given day, also may be analyzed to more fully optimize systems and services. To illustrate, a museum may observe the changes in the density map over the day to identify the displayed objects that are of highest interest to the museum patrons and the order in which the museum patrons visit the objects, and then more effectively position the objects within the museum facility based on this analysis.

In some implementations, the density map is generated by a remote processing system and maintained for use by entities affiliated with the operator of the remote processing system, such as in the HVAC management example above. In other implementations, the density map may be transmitted to the electronic devices in the facility for display to the user. To illustrate, the density map may be used to highlight the current concentration of visitors to a music festival, and this density map may be provided to the electronic devices of the visitors so that they can use the density map to identify the most popular venues or other points of interest and plan their visit accordingly.

With the individualized density map 302, the locations of the individual electronic devices within the facility can also be linked to other sensor available by the electronic device so as to obtain more information about some aspect of the facility. To illustrate, the tight timing synchronization afforded by GPS signaling can be leveraged by a cloud service so as to direct a number of electronic devices within a specified area of the facility to concurrently or sequentially capture imagery of the specified area from their different perspectives, and then this imagery can be stitched together by the cloud service so as to provide, for example, a 360-degree 3D view of an object in the specified area, or to provide a "bullet time" rendition of an object or event by stitching together a sequence of images captured of an area or object from the different perspectives of the participating electronic devices.

Figure 4:
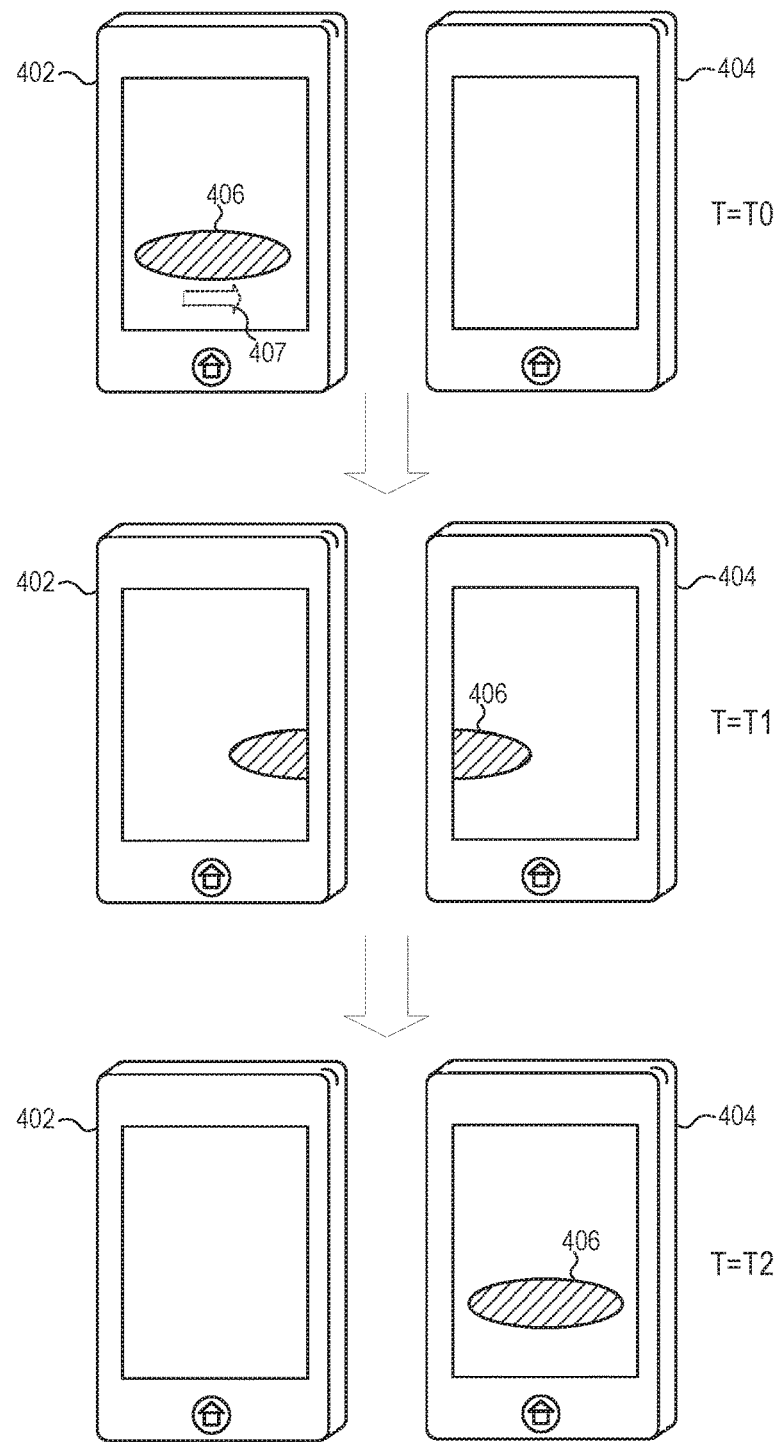
FIG. 4 is a diagram illustrating an example of an augmented reality interaction between two devices based on their physical orientation to each other in accordance with at least one embodiment of the present disclosure.
Figure 5:
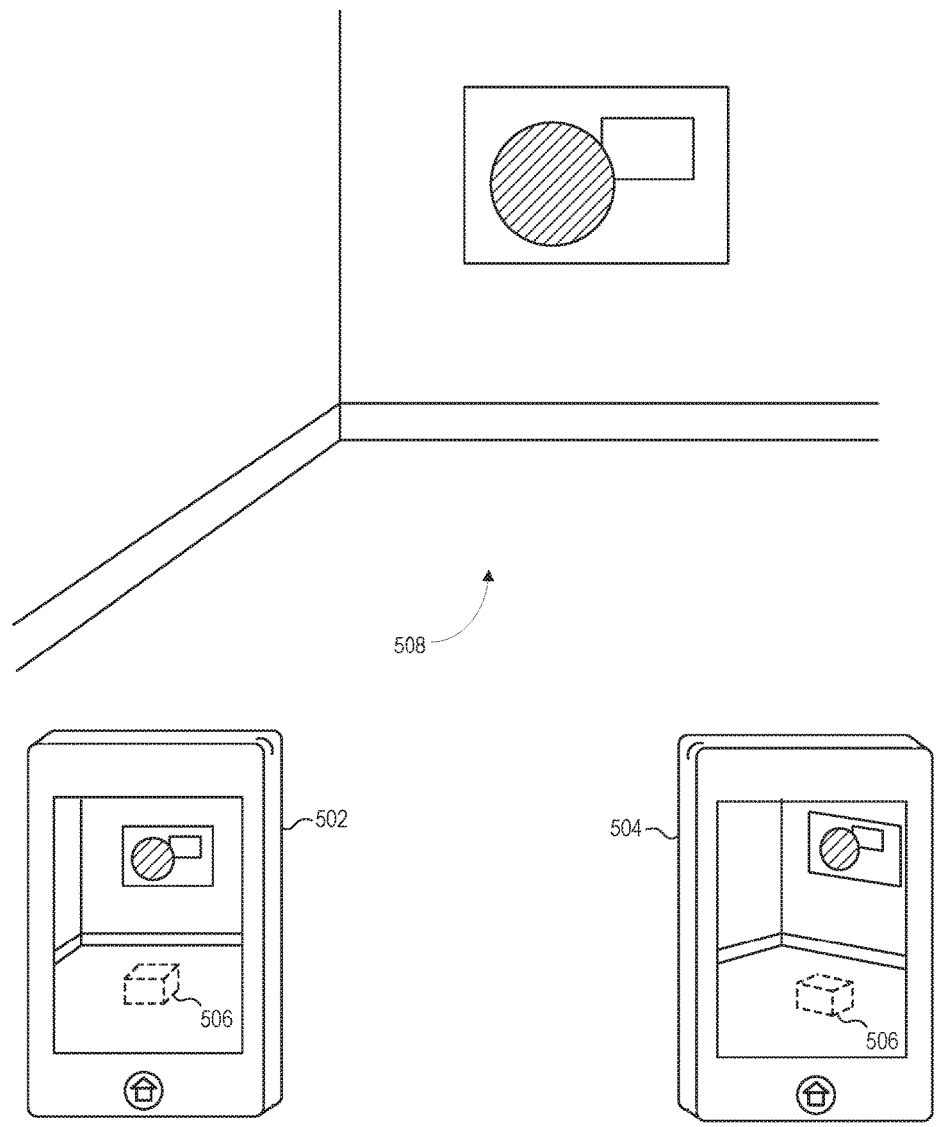
FIG. 5 is a diagram illustrating another example of an augmented reality interaction between two devices based on their physical orientation to each other in accordance with at least one embodiment of the present disclosure.

FIGS. 4 and 5 illustrate example implementations of a location-based service that controls interactions between two or more electronic devices in an augmented reality setting based on the physical orientation/position of the two or more electronic devices relative to each other in accordance with at least one embodiment. As noted above, the electronic device 100 can provide AR functionality whereby video or other imagery captured by the electronic device 100 is displayed at the display 104 in combination with an AR overlay that includes additional information or graphical objects. Often this AR functionality extends over multiple electronic devices (e.g., through the use of a cloud service as an intermediary) such that interactions between the electronic devices are reflected in some manner in the AR overlays of the electronic devices. In at least one embodiment, the electronic devices can use their current position/orientation information to determine their physical position/orientation relative to each other, and this physical position/orientation can control or impact how the AR interactions are depicted within the AR overlays.

To illustrate, in FIG. 4 two electronic devices 402, 404 are cooperating to provide a shared AR functionality whereby the AR overlay of each electronic device coordinates with respect to the local environment shared by both electronic device 402, 404. This AR overlay includes a virtual object 406, such as a graphical representation of a disc. The electronic devices 402, 404 communicate their respective positions/orientations, and from this the AR functionality determines that the electronic devices 402, 404 are physically oriented to be side-by-side with the electronic device 402 to the left of the electronic device 404. At time T=T0, the virtual object 406 is located in the AR overlay of the electronic device 402, and the user uses a touchscreen to effect a left-to-right swiping motion 407 to initiate movement of the virtual object 406 to the right. In response to this input and in response to the physical position/orientation of the electronic devices 402, 404, the AR overlays on both the electronic devices 402, 404 coordinate to simulate a transfer of this virtual object 406 from the AR overlay of the electronic device 402 to the AR overlay of the electronic device 404, such that at time T=T1 the virtual object 406 is depicted as half in the AR overlay of the electronic device 402 and half in the AR overlay of the electronic device 404, and at time T=T2 the virtual object 406 is depicted as fully transferred to the AR overlay of the electronic device 404. In similar manner, if there were another electronic device physically oriented to the left of the electronic device 402, a right-to-left swiping motion on the touchscreen of the electronic device 402 would result in a transfer of the virtual object 406 to the AR overlay of this other electronic device.

As another example of this technique, a user of the electronic device 402 may be standing in a room with a television to the front of the electronic device 402 and a stereo system to the right of the electronic device 402. The user may be listening to music using an audio application on the electronic device 402, and desire to transfer the music playback to one of the television or stereo system. To transfer the music playback to the television, the user may make a forward swiping motion, in response to which the electronic device 402 determines that the television is oriented and positioned in front, and thus the electronic device 402 communicates with the television to arrange for a hand-off of the music playback to the television. Alternatively, if the user makes a left-to-right swiping motion, the electronic device 402 determines that the stereo system is oriented and positioned to the right, and thus electronic device 402 communicates with the stereo system to arrange for a hand-off of the music playback to the stereo system.

FIG. 5 illustrates another example whereby the physical position/orientation between two electronic devices 502, 504 is used to control how each electronic device views a virtual object 506 inserted into a local environment 508 observed by the electronic devices 502, 504. In this example, the user of the electronic device 502 interacts with the electronic device 502 to place the virtual object 506 as an AR overlay on the imagery of the local environment 508 captured by the imaging cameras of the electronic device 502 in its particular position/orientation. The AR software of the two electronic devices are in communication, so in response to the generation and placement of the virtual object 506 in the virtualized representation of the local environment 508, the AR software of the electronic device 504 determines how its physical position/orientation relative to the virtual object 506 differs compared to the electronic device 502, and thus prepares a representation of the virtual object 506 in the AR overlay of the electronic device 504 to reflect this difference so as to accurately depict how the virtual object 506 would appear given the particular position/orientation of the electronic device 504.

The adaptation of the AR display of the virtual object 506 in another electronic device based on physical position/orientation can be used for either concurrent viewing of the virtual object, or for time-shifted viewing. To illustrate, both the electronic device 502 and the electronic device 504 could be concurrently viewing the local environment 508, and thus the generation, modification, or other manipulation of the virtual object 506 by one of the electronic devices is soon reflected in the AR overlay of the other. Either user may then interact with the virtual object 506 via the corresponding electronic device, and the manipulation of the virtual object 506 would then be reflected in the depiction of the virtual object 506 in the AR overlay of the other electronic device.

Alternatively, the user of the electronic device 502 could place the virtual object into its indicated position at one time, and then when the user of the electronic device 504 comes into the local environment 508 at another time, the virtual object 506 is then made viewable in the AR overlay of the electronic device 504 in a manner appropriate to the point of view of the object considering the current position/orientation of the electronic device 504. Under this approach, the persistence of the virtual object 506 may be maintained by prior storage of data representing the virtual object 506 and its current position/orientation at the electronic devices 502, 504, by using a cloud service to coordinate the presentation of the virtual object 506 with the proper perspective view at different times and different locations/orientations and for different devices, or a combination thereof.

Figure 6:
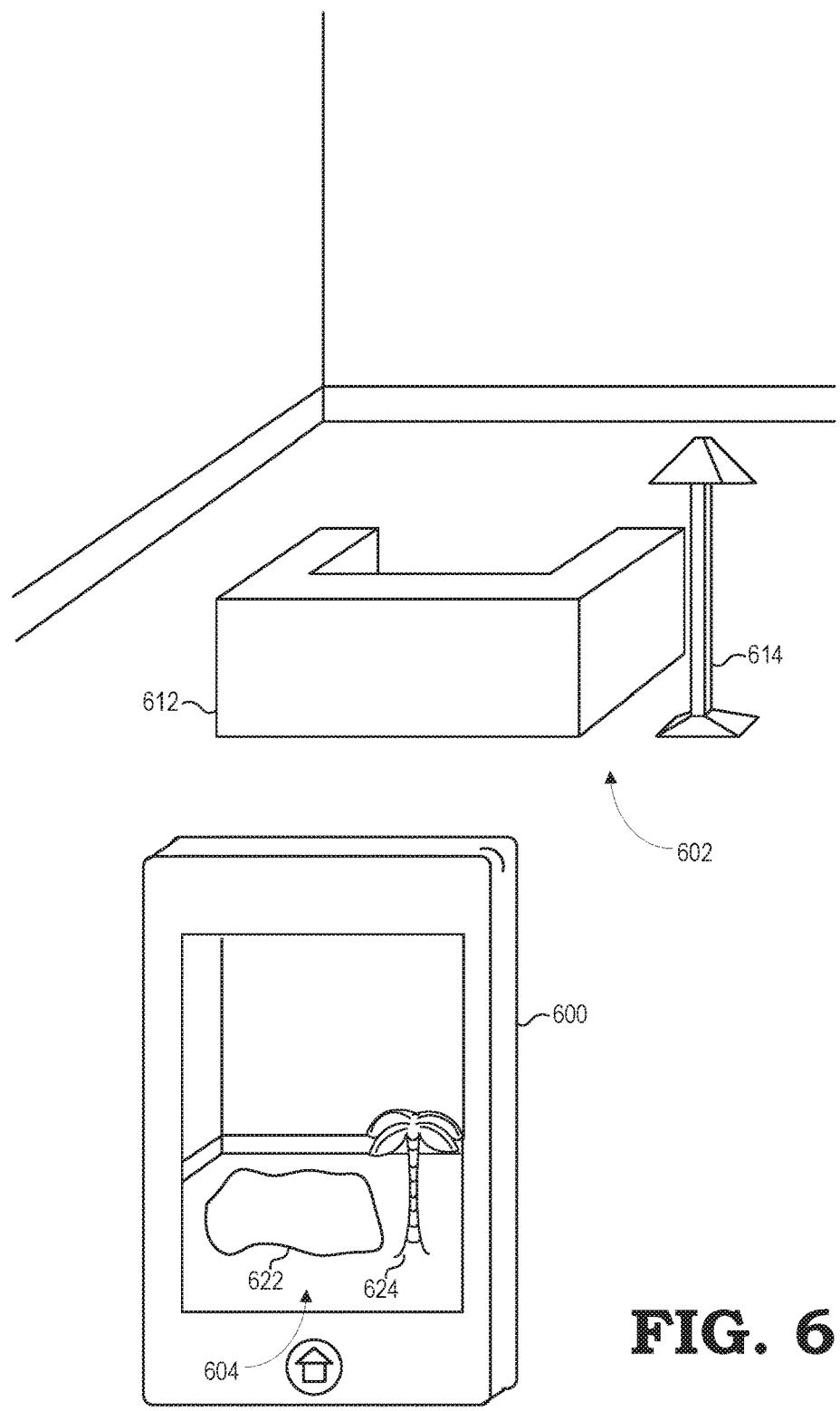
FIG. 6 is a diagram illustrating an example of an augmented reality overlay at an electronic device in which depictions of physical objects are replaced by depictions of virtual objects having matching geometry in accordance with at least one embodiment of the present disclosure.

FIG. 6 illustrates an example implementation of a location-based service that facilitates the transformation of a local environment as viewed through the imaging cameras and display of an electronic device in accordance with at least one embodiment. An electronic device 600 can utilize its imaging cameras to capture imagery of the local environment 602 as the user moves through the local environment 602, and provide an AR overlay 604 over this imagery so as to transform local environment as depicted in the display 104 of the electronic device 600 into an alternate reality whereby depictions of physical objects in the local environment 602 within the captured and displayed imagery are "replaced" with corresponding objects in accordance with the theme of the transformation. To illustrate, the AR overlay 604 may implement a "jungle" theme whereby physical objects in the captured imagery are replaced with jungle-themed objects in the display of the imagery at the electronic device 600. Thus, a couch 612 and a lamp 614 captured in the imagery of the local environment 602 could be replaced with imagery of a boulder 622 and a palm tree 624, respectively, in the AR overlay 604. Likewise, walls in the local environment can be replaced with depictions of rows of trees or rows of bamboo, patches of grass can be replaced with depictions of quicksand, etc.

In some embodiments, this AR overlay 604 is intended as a 3D AR overlay such that as the user moves the electronic device 600 around the local environment 602, the view of the physical objects changes in the captured imagery, and thus the electronic device 600 changes the view of the replacement virtual objects to match. That is, the virtual objects may be implemented as 3D graphical representations such that as the electronic device 600 moves relative to the physical object represented by a virtual object in the AR overlay 604, the view of the virtual object presented in the AR overlay 604 changes in response to the change in perspective of the electronic device 600. To this end, the electronic device 600 may determine its current position/orientation, and from this determine how the virtual objects would appear in the current scene depicted by the electronic device 600, and format the AR overlay 604 accordingly.

To perform this replacement, the electronic device 600 first identifies physical objects in the captured imagery and which are candidates for virtual object replacement. In some embodiments, this process can include using object detection algorithms to detect objects within the images, as well as estimation of the dimensions of the objects using, for example, depth information from a depth sensor, or based on comparison of the size of the object in the imagery to some known scale or calibration tool. Moreover, the canonical orientation or features of the object also may be identified to ensure more precise geometric matching between the appearance of the physical object and its replacement virtual object, such that the proxy virtual object substantially matches the geometric constraints of the physical object. To illustrate, based on the size of the couch 612 and based on the couch 612 having a primarily horizontal canonical orientation, the electronic device 600 may determine that the boulder 622 is a suitable proxy, and the depiction of the boulder 622 may be formatted such that the canonical orientation of the boulder 622 follows the corresponding canonical orientation of the couch 612. Conversely, based on the size of the lamp 614 and based on the lamp 614 being primarily vertical in appearance, the electronic device 600 may chose the palm tree 624 as a suitable proxy, with the depiction of the palm tree 624 scaled, oriented, and otherwise formatted accordingly. Other examples can include, for example, replacing walls with rows of bamboo or other trees, chairs with ruminants, curtains with vines, and the like. In this manner, the local environment 602 can be transformed into a jungle-themed alternate reality while maintaining the geometries of the local environment in the alternate reality, albeit in a different visual form.

Figure 7:
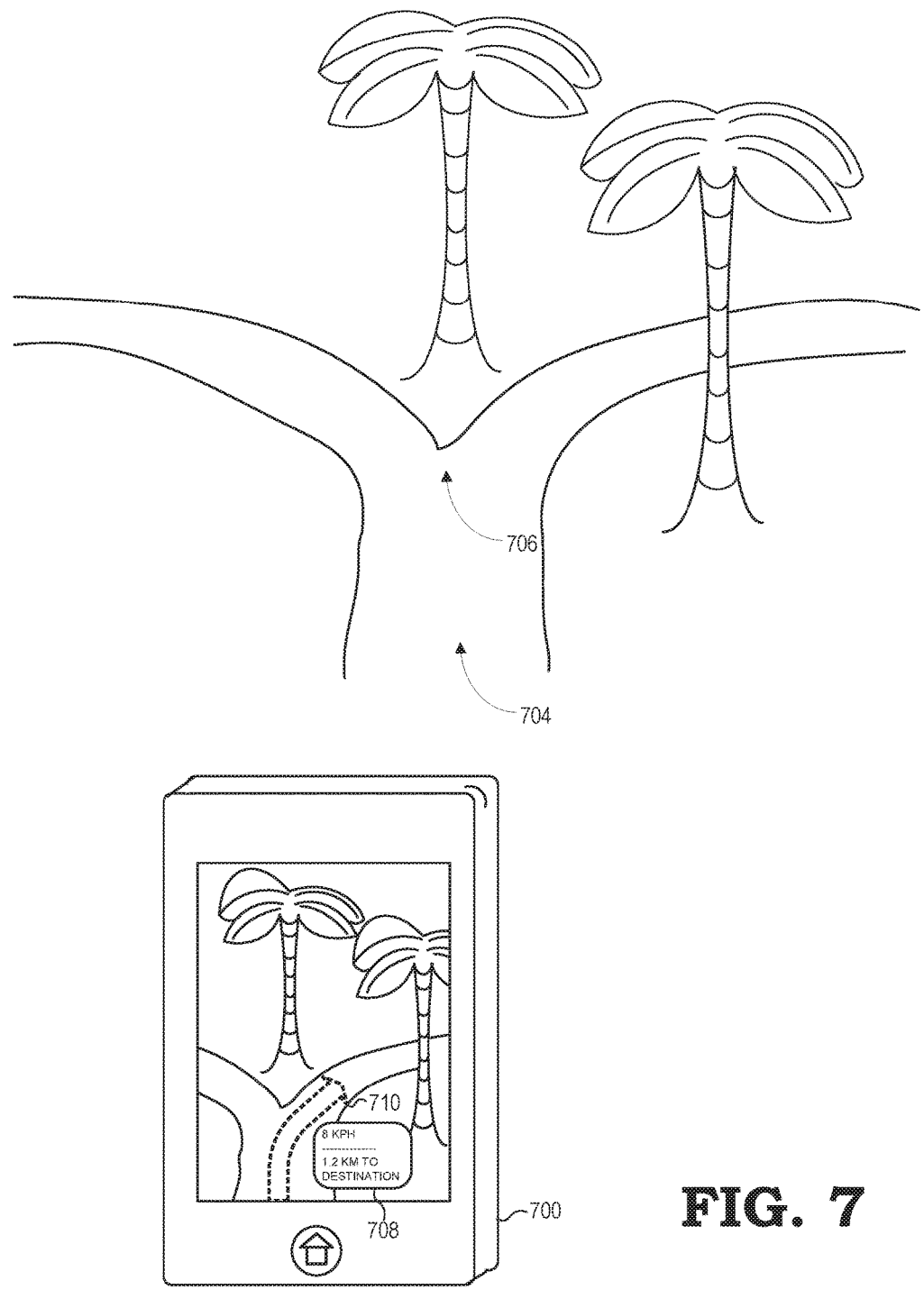
FIG. 7 is a diagram illustrating an example of an augmented reality overlay at an electronic device in which navigation aids are depicted in accordance with at least one embodiment of the present disclosure.
Figure 8B:
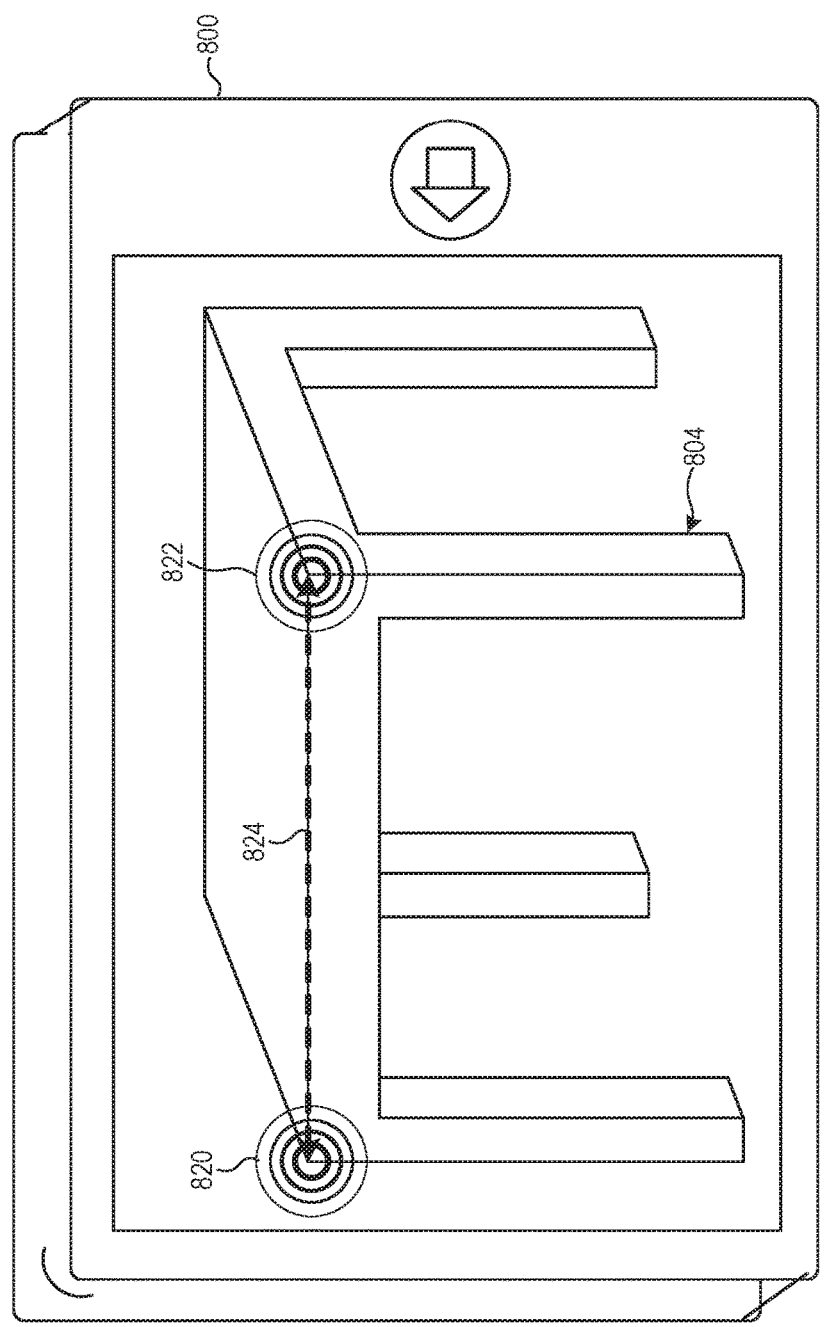
FIG. 8B is a diagram illustrating an example of measuring a dimension of an object using an electronic device based on 3D mapping of the object in accordance with at least one embodiment of the present disclosure.

FIG. 7 illustrates an example implementation of a location-based service that facilitates user navigation through a local environment through an AR overlay on captured imagery of the local environment in accordance with at least one embodiment. In this implementation, a user of a smartphone, tablet computer, or other electronic device 700 may specify a sought-after object or intended destination. In response, the electronic device 700 may query a cloud service or a local mapping database to determine the position or location of the object or destination. From this, the electronic device 700 may determine a route to the object or destination, and then provide navigational assistance to the user in the form of graphical navigational aids displayed as an AR overlay on the displayed captured imagery of the local environment.

To illustrate using the example depicted in FIG. 7, a user of the electronic device 700 may program in a destination and start out walking along a path 704. As the user approaches a fork 706 in the path 704, the user may hold up the electronic device 700 such that the fork 706 is displayed at the display 104 of the electronic device 700. In response, the electronic device 700 may determine its current position and the path between its current position and the intended destination, and then provide navigational assistance to the user by providing an AR overlay 708 that displays a right-bearing arrow 710 identifying the right branch of the fork 704 as the correct choice to reach the destination. The AR overlay 708 further can include additional information about the path or the trip thus far, such as the user's current speed, the distance to the destination along the current path, and the like.

As another example, this navigational assistance feature can be used to facilitate user navigation in a retail setting. To illustrate, a user may enter a store intending to purchase an item, but the user is unaware of where the item is stocked within the aisles and shelves of the store. The store thus may maintain a database storing information regarding the layout of the store and the location of each item stocked by the store within this layout. The electronic device 700 may access this database from a cloud service to pinpoint the location of the item within the store, and given the current position/orientation of the electronic device 700, determine a path to the location of the item and provide navigational assistance through navigational cues displayed in an AR overlay at the electronic device 700. Such navigational assistance can include, for example, displaying directional cues (e.g., which direction to head, arrows pinpointing the position of the item on a shelf), aisle/shelf numbers, one or more images of the item or its packaging to facilitate identification of the item on the shelf, and the like.

Further, in some embodiments, the AR overlay can provide navigation assistance in a form akin to "X-ray vision" whereby the AR overlay can depict the item in its location through one or more aisles or other barriers between the item in its location and the electronic device 700. In support of this feature, the database of the store supplies a three-dimensional mapping of the store interior so that the electronic device 700 can accurately render the intervening shelves and other barriers in transparent or semi-transparent form consistent with the view perspective of the shelves and other barriers to the electronic device 700 in its current position/orientation.

The store navigational feature can be used in conjunction with retail analytics or advertisement functionality to provide additional information to the user via the AR overlay. To illustrate, a user may enter a store to obtain mint-flavored mouthwash, and a cloud service may use this information to determine whether any corn starch is in the current inventory of the store, and if not, determine that the citrus-flavored mouthwash that is in stock is a viable alternative and thus provide navigational assistance to the location of the citrus-flavored mouthwash instead. Further, the AR overlay may be used to display any coupons, discounts, or deals for the item sought, to display targeted advertising based on the sought-after item, or to provide reviews from one or more sources to help the user choose between one or more brands of the item in stock at the store.

FIG. 8A illustrates an example implementation of a location-based service that facilitates object measurement in accordance with at least one embodiment. In this implementation, the ability of an electronic device 800 to accurately pinpoint its relative position using one or a combination of position-determining techniques such as visual odometry, GPS, inertial navigation, and the like, is leveraged to enable accurate measurement of one or more dimensions of a physical object. From these dimensions, other physical measurements of the physical object may be determined, such as an area of a feature of the object, a volume of the object, an angle of a plane or edge of the object relative to gravity or another edge or plane, and the like.

In one embodiment, the one or more dimensions of a physical object are determined by determining the distance between the position of the electronic device 800 at one end of the physical object and the position of the electronic device 800 at the other end of the physical object along a measurement axis. To illustrate, in the example of FIG. 8A, the electronic device 800 can be used to measure the diagonal dimension 802 of the top of a table 804. To measure the diagonal dimension 802, the user positions the electronic device 800 at corner 806 and then signals the electronic device 800 to mark its current position 807 by, for example, pressing a button on the electronic device 800 or by gently tapping a corner of the electronic device 800 against the corner 806. The user then positions the electronic device at the opposite corner 808 and again signals the electronic device 800 to mark its current position 809. The electronic device 800 then may calculate the dimension 802 (that is, the distance between the two corners 806, 808) as the distance 810 between the positions 807 and 809 of the electronic device 800. This process may be repeated for each additional dimension of interest.

As part of this measurement process, the electronic device 800 may need to compensate for any deviations caused by inconsistent placement or orientation of the electronic device 800 by the user. To illustrate, the user may have held the electronic device 800 in a horizontal position when tapping the corner 806 while holding the electronic device 800 in a vertical position when tapping the corner 808. Thus, the electronic device 800 also may note its orientation at each of positions 807, 809 and compensate for any inconsistent orientations between the positions by adjusting distance 810 by an offset or scaling factor based on the orientation deviations.

This dimension-measuring technique may be combined with object-recognition functionality so as to particularly identify the physical object, and then query a database to obtain additional information of the identified object, including, for example, additional dimensional data for the physical object. To illustrate, the user may enter a large furniture store and spot a couch. Interested in the couch but concerned that the couch may not fit into the user's living room, the user can use the dimension-measurement technique described above to determine a major dimension of the couch. The user also then uses the electronic device 800 to capture one or more images of the couch, in addition to capturing depth information for the images using a depth sensor as described above. The dimension measurement, images, and depth information are then transmitted to a cloud service that analyzes the images to identify the particular model of the couch. In this example, the measured major dimension of the couch is used by the cloud service to limit its search to only those models of couches that fit that measured dimension. Likewise, because the depth information is substantially independent of lighting and background, the geometry information revealed by the depth information can be used to further constrain the scope of the search, thereby facilitating a more efficient object recognition search. When the model of the couch is so identified, the cloud service can access its databases to determine additional information on the model of couch and forward this information to the electronic device 800 for display to the user. This additional information can include, for example, additional dimensional information, warranty information, product description, user reviews, prices offered by various retailers, advertisements for associated goods and services, and the like.

In some embodiments, one or more dimensions of the physical object are determined based on 3D mapping of the physical object through depth information from a depth sensor or other information, and the user's interaction with imagery of the physical object on the display of the electronic device 800 is then used to provide dimensional information. To illustrate, in the example of FIG. 8B, a user captures imagery of the table 804, which is displayed at the display of the electronic device 800. The electronic device 800, or a cloud service in communication with the electronic device 800, determines a 3D mapping of the salient edges of the imagery containing the table 804, such as by using depth information obtained from a depth sensor of electronic device 800 or by obtaining a CAD model of the table 804 from a previously-defined 3D mapping of the table 804 (and identified using, for example, the position and orientation of the electronic device 800 at the time of capture of the imagery). The user may then interact with this imagery to define two or more points of interest on the depicted imagery of the table 804, such as by tapping the touchscreen of the electronic device 800 at points 820 and 822, which coincide with the two top corners of the front face of the table 804, or by moving a mouse or other cursor to these two points and marking them as points of interest. Alternatively, the electronic device 800 or cloud service may utilize a 3D model of the table 804 to render a 2D view of the table 804 from some perspective (e.g., a top-down view or a front view) of the table 804, and the user may select the points of interest from this 2D view.

The electronic device 800 or associated cloud service may then calculate one or more dimensional measurements from the points of interest using a 3D model of the table 804 determine from depth information or a priori modeling. For example, the with the points 820 and 822 selected, the electronic device 800 may measure the distance 824 between these two points 820 and 822 based on a CAD model or other 3D mapping of the table 804, and thus determine the width of the table 804 because the two points 820 and 822 pinpoint the opposite corners of the table 804. In the event that three points are selected, the electronic device 800 or cloud service can calculate the distances between the three points, the angles between the lines between the three points, the area defined by the three points. In the event that more than three points are selected, the electronic device 800 also can determine the volume of the space defined by the four or more points. These dimensional evaluation techniques thus can be used to analyze the relationships between objects (e.g., the angle of intersection of two walls, whether a picture or table top is level) or envision an imaged object in another space. For example, a user could capture an image of a doorway leading into the user's bedroom to determine its dimensions, and then when at a furniture store, the user can take a picture of a dresser cabinet to determine the cabinet's dimensions, and from this determine whether the cabinet would fit through the doorway if the user chose to purchase the cabinet.

The image-based dimensional measurement technique also can be automated, rather than responding to user input. To illustrate, while the user is operating the imaging cameras of the electronic device to capture still picture or video imagery, in the background the electronic device 800 may performing 3D mapping analysis to identify the salient dimensions of the physical objects captured in the imagery. This identification may be performed using 3D modeling using depth information, by identifying the position and orientation of the electronic device 800 and then accessing a 3D model database to identify the objects present in the device's view based on the position/orientation information. Thus, when a user indicated interest in one of the physical objects, the electronic device 800 may provide information on one or more of the dimensions, volume, area, pertinent angles, and the like, using, for example, an AR overlay.

Figure 9:
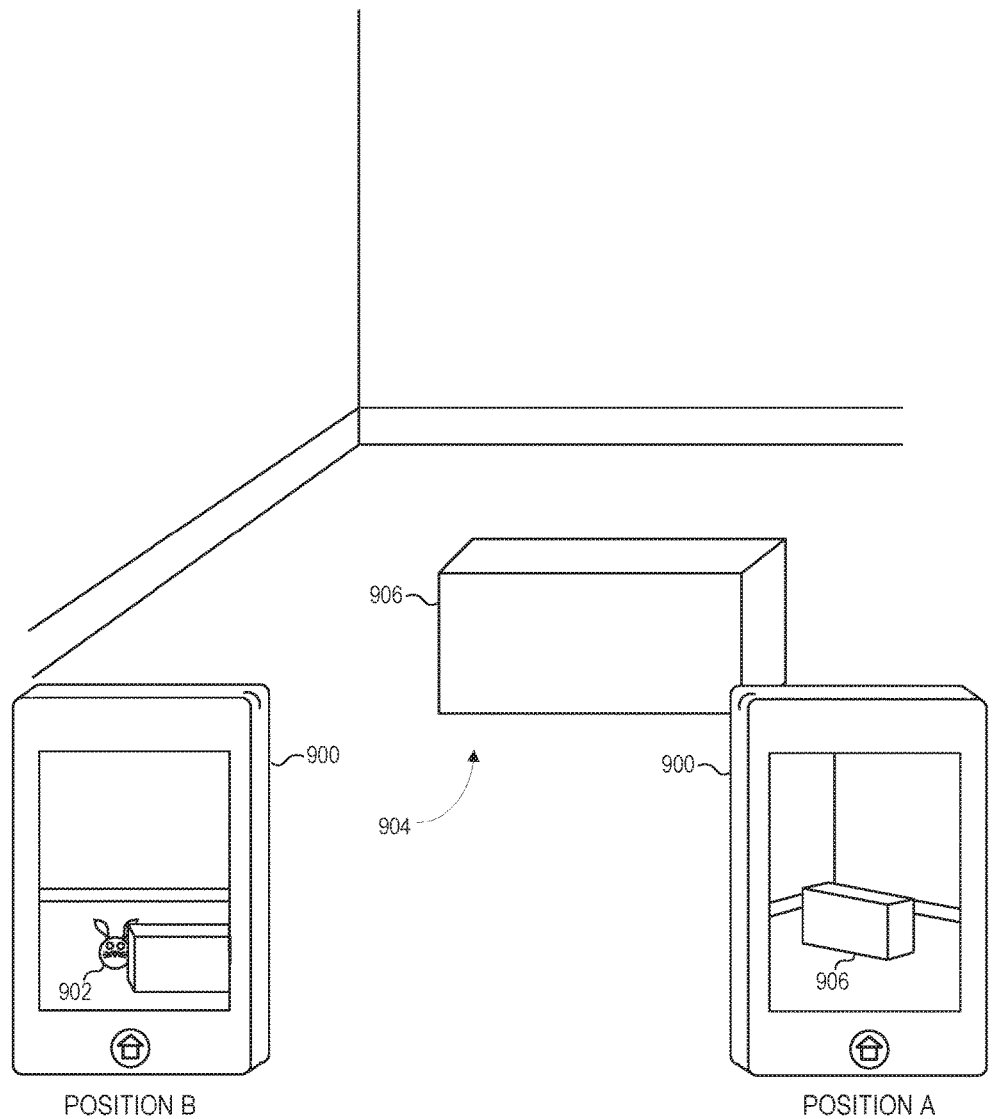
FIG. 9 is a diagram illustrating an example of an augmented reality overlay at an electronic device in which a virtual pet is depicted in accordance with at least one embodiment of the present disclosure.
Figure 10:
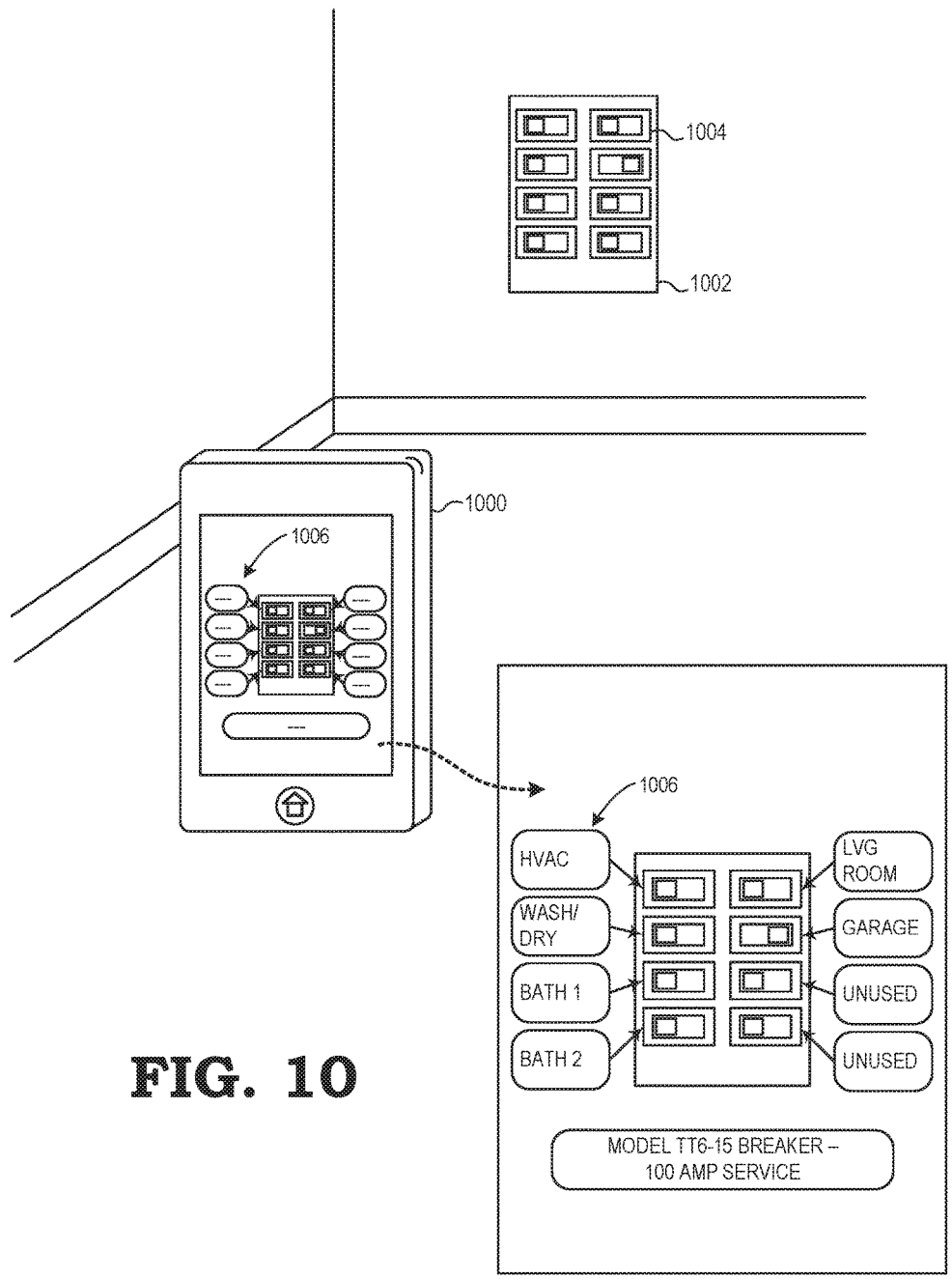
FIG. 10 is a diagram illustrating an example of an augmented reality overlay at an electronic device in which instructional assistance is depicted in accordance with at least one embodiment of the present disclosure.
Figure 11:
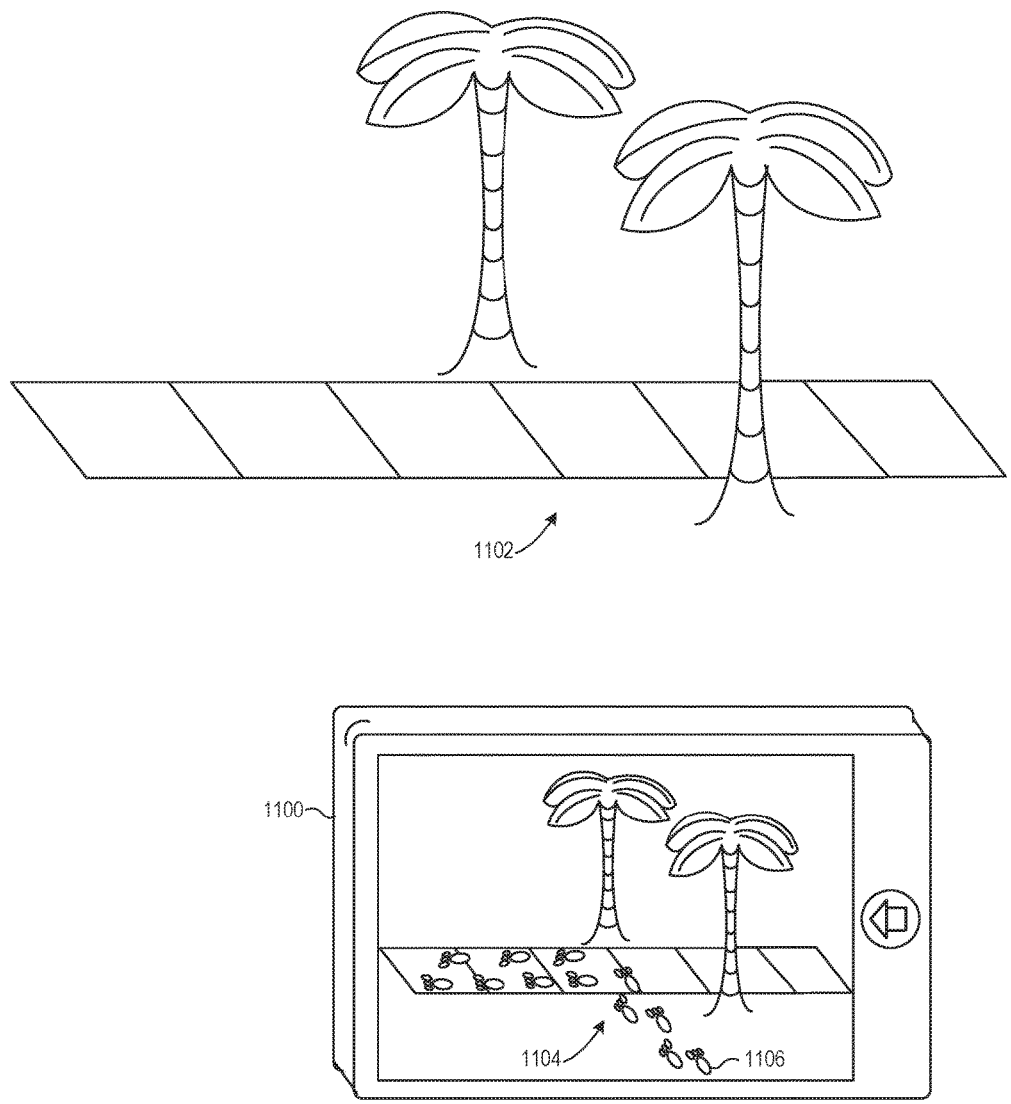
FIG. 11 is a diagram illustrating an example of an augmented reality overlay at an electronic device in which prior user path information or other visual pedometry information is depicted in accordance with at least one embodiment of the present disclosure.

FIGS. 9-11 illustrates example implementations of location-based services that facilitate display of an AR overlay on captured imagery of a local environment such that graphical content of the AR overlay is integrated with the physical objects of the local environment in the captured imagery based on the pose (position/orientation) of the electronic device relative to the objects in accordance with at least one embodiment. With the pose of the electronic device in the 3D space representing the local environment, the electronic device can present or format 3D graphical content or metadata in the same 3D space presented by the displayed imagery so that the graphical content is geometrically consistent or compliant with the geometries of the physical objects in the local environment. To illustrate, the location-based services may provide a virtual pinball game whereby a pinball AR overlay is displayed over video imagery of the side of a building captured by the electronic device. Using 3D mapping techniques, the portable electronic device can determine the dimensions and geometry of the side of the building, and from this information and from its current pose, the electronic device can format an AR overlay such that the pinball game elements are viewed from a perspective that matches the dimensions and geometry of the side of the building. The pinball AR overlay is thus formatted to follow the contours of the building using the perspective represented by the pose of the portable electronic device, and elements of the building facade, such as windows or cornices, may be incorporated as barriers or gaming features in the pinball game.

Further, depth information available from the depth sensor implemented at the electronic device can be used to incorporate user actions into the material presented by the AR overlay. To illustrate, a user may use the electronic device to capture imagery of a neighborhood park, and with this imagery and a mapping of the area obtained either from the depth sensor or separate 3D mapping information for the park (e.g., as provided by a cloud service), the electronic device can implement an AR overlay on the live feed of video imagery in a manner that depicts a virtual ball present in the local environment, and whereby the depth sensor can detect the user kicking at this virtual ball (by detecting the user's foot as it enters the field of view of the depth sensor), and from the velocity and direction of the user's foot, simulate the virtual ball traveling through the imagery of the local environment as though it was in fact kicked. Because the electronic device is aware of its position and orientation with respect to the local environment, changes in either of the position and orientation can be accurately reflected by changing the perspective of the AR overlay to match the changed position/orientation. To illustrate, as the virtual ball in the example above is travelling across a grass lawn, the user may run behind the virtual ball, and the AR overlay updates the view of the virtual ball to reflect the changing perspective.

Additionally, because the depth sensor or a priori 3D mapping information informs the electronic device of the geometries of the physical objects and their distances from the electronic device, the electronic device can use this information to format the AR overlay such that virtual objects realistically interact with physical objects. For example, the AR overlay can determine the trajectory of the virtual ball within the local environment, detect the presence of a wall along this trajectory, and thus depict the virtual ball as bouncing off of the physical wall in a manner that emulates the behavior of an actual physical ball traveling along the same trajectory. As another example, the electronic device may detect two different physical objects at different distances from the electronic device and when the trajectory of the virtual ball is plotted to take the virtual ball between these two physical objects, the AR overlay can be formatted to depict the virtual ball as disappearing behind the closer physical object while remaining in front of the farther physical object.

FIG. 9 illustrates an example of this AR overlay technique in the context of a virtual pet game provided by an electronic device 900. In this virtual pet game, the electronic device 900 provides an AR overlay that depicts a pseudo-autonomous virtual pet 902 in a local environment 904 (e.g., the pet "owner's" house). With knowledge of the geometry of the local environment 904 determined using one or more 3D mapping techniques, the AR overlay can be formatted to provide the appearance of the virtual pet 902 interacting with the local environment 904 and the user of the electronic device 900. The virtual pet 902 can be depicted as scampering across the floor, hiding behind objects, traveling in and out of rooms, and interacting with the user. To illustrate, the virtual pet 902 may be depicted as skittish, such that as if the user gets "too close" to the virtual pet 902, the virtual pet 902 is depicted as heading for a closet to hide. As with the examples above, this virtual pet AR overlay can utilize the geometries of physical objects within the local environment 904 to render the physical behavior of the virtual pet 902 more realistic, such as by realistically depicting a trajectory of the virtual pet 902 so that it disappears behind physical objects that are closer to the electronic device. Moreover, external data may be utilized to modify or control the depicted behavior of the virtual pet 902. To illustrate, knowing cat's fondness for napping in sunbeams, the electronic device 900 can determine its current longitude and latitude and the current time of day, and from this information determine the position of the sun in the sky by accessing the appropriate database from a cloud service. With the position of the sun so determined, and with knowledge of the placement and orientation of windows in the local environment, the electronic device can determine the angle and presence of a sunbeam anticipated to be streaming in through a window in the local environment 904 and depict a virtual cat (an example of the virtual pet 902) as moving to and then napping in the location of the sunbeam.

As with the other examples of AR overlays described above, the virtual pet AR overlay utilizes the current pose of the electronic device 900 to inform the content displayed in the AR overlay. To illustrate, the electronic device 900 may simulate the actions of the virtual pet 902 such that it appears to hide behind a physical object 906 in the local environment 904 after being "scared" by the user. Accordingly, when the user holds the electronic device 900 in position A depicted in FIG. 9, the AR overlay omits presentation of the virtual pet 902 so as to give the appearance of the virtual pet 902 hiding behind the physical object 906. However, when the user moves the electronic device 900 to position B depicted in FIG. 9, the new pose of the electronic device 900 permits viewing behind the physical object 906, and thus the AR overlay depicts the virtual pet 902 behind the physical object 906.

FIG. 10 illustrates an example of the AR overlay technique in the context of instructional content provided by an electronic device 1000. In this approach, the AR overlay can provide instructional information intended to guide a user's interaction with a physical object in the local environment. To this end, the electronic device 1000 captures and displays imagery of the physical object. The electronic device 1000 determines its position and orientation relative to the physical object (as currently depicted in the imagery), and from this formats an AR overlay so that the instructional information presented in the AR overlay is consistent with the geometry of the physical object as presented in the electronic device's view of the physical object. In the example of FIG. 10, a circuit has blown in the user's house, and the user thus needs to throw the appropriate circuit breaker to reset the circuit. The user is unaware of the location of the circuit breaker panel 1002 for the house, and thus the user interacts with an electronic device 1000 to bring up a CAD model of the house, which pinpoints the location of the circuit breaker panel 1002. Further, an AR overlay can provide the "X-ray" feature described above so as to depict the circuit breaker panel 1002 through one or more walls or other obstacles in the house.

With this information, the user travels to the circuit breaker panel 1002 and positions the electronic device 1000 to face the circuit breaker panel 1002 having a plurality of circuit breakers 1004 for various circuits within the user's abode. To enable the user to identify which circuit breaker 1004 belongs to which circuit, the electronic device 1000 can scan a QR code on the circuit breaker panel 1002 to determine the model of the circuit breaker panel, and with the model so identified, access a database compiled by the builder of the home that identifies the pairings between circuit breaker and circuit for the given model. The electronic device 1000 then can provide an AR overlay 1006 that provides graphical icons identifying the circuit for each circuit breaker 1004 present in the displayed imagery of the circuit breaker panel 1002. Furthermore, the electronic device 800 can access the wiring information from the CAD model of the house to determine the position of the wiring of various circuits, and then provide an AR overlay depicting where the wiring is located in relation to the walls, ceiling, floor, and other spaces depicted in the captured imagery displayed by the electronic device 1000.

As another example of an instructional AR overlay, the user can use the imaging camera of the electronic device 1000 to capture video of the user throwing a baseball. The electronic device 1000 then may detect the geometry of the user as the user performs the throwing the baseball using the depth sensor, and compare this to an idealized throwing model that is scaled to the user's particular physiology. The electronic device 1000 then may overlay this idealized throwing model on top of the playback of the video of the user throwing the baseball, thereby allowing the user to identify any deviations between the user's throwing mechanics and the ideal throwing mechanics.

As yet another example of an instructional AR overlay, a user may need to undo a paper jam in a photocopier. Thus, the user can focus the imaging camera of the electronic device 1000 on the photocopier, in response to which the electronic device 1000 uses a QR code, bar code, or other visual indicia to identify the model of the photocopier. The electronic device 1000 then can access from a database the visual instructions for solving a paper jam for that particular model, and then overlay graphical representations of these instruction over the captured imagery of the photocopier displayed at the electronic device 1000. To this end, the electronic device 1000 can determine its perspective view of the photocopier based on the current pose of the electronic device 1000 or based on depth information collected from the depth sensor, and then format the graphical representations so as to match the perspective view of the photocopier as displayed in the captured imagery. To illustrate, based on the identified perspective view, the AR overlay can locate a graphical icon identifying a toner release lever such that it is positioned over the location of the toner release lever in the displayed imagery of the photocopier.

FIG. 11 illustrates an example of the AR overlay technique in the context of virtual pedometry provided by an electronic device 1100. In this approach, the electronic device 1100 can monitor and record a path of the user as the user traverses through a local environment 1102. The user's prior path thus may be reflected in an AR overlay 1104 of the electronic device 1100 whereby the user's prior path is represented in displayed imagery of the local environment 1102 using some form of a graphical representation, such as barefoot icons 1106 that are oriented in the direction of travel at each point. Accordingly, the user may identify where the user has and has not been within the local environment 1102 by viewing the local environment 1102 through the display 104 (FIG. 1) of the electronic device 1100 with the AR overlay 1104 present. Moreover, if there are multiple electronic devices 1100 cooperating in this regard, the paths of the users may be made available to each of the multiple electronic devices via a cloud service, and thus the AR overlay 1104 at one of the electronic devices 1100 may depict the prior paths or locations of some or all of the other users. This pedometry AR overlay further may incorporate sound effects to enhance the experience. To illustrate, the electronic device 1100 may use an accelerometer to detect the footfall pattern of the user, and as the user's foot strikes the ground (or is anticipated to strike the ground), the electronic device 100 may play a footfall sound synchronized to this foot strike, and also may display the next footfall icon in the AR overlay 1104 to coincide with this foot strike. This functionality may be utilized as a game, such as an AR version of the light-cycle game played in the Tron movie. The user also may use this functionality to identify areas of the local environment 1102 that the user has already visited, or has not yet visited. Moreover, the tracking of the path of the user can be used by the electronic device 1100 to measure non-linear distances, such as the length of a path walked by the user or a distance a user walks between two buildings.

Figure 12:
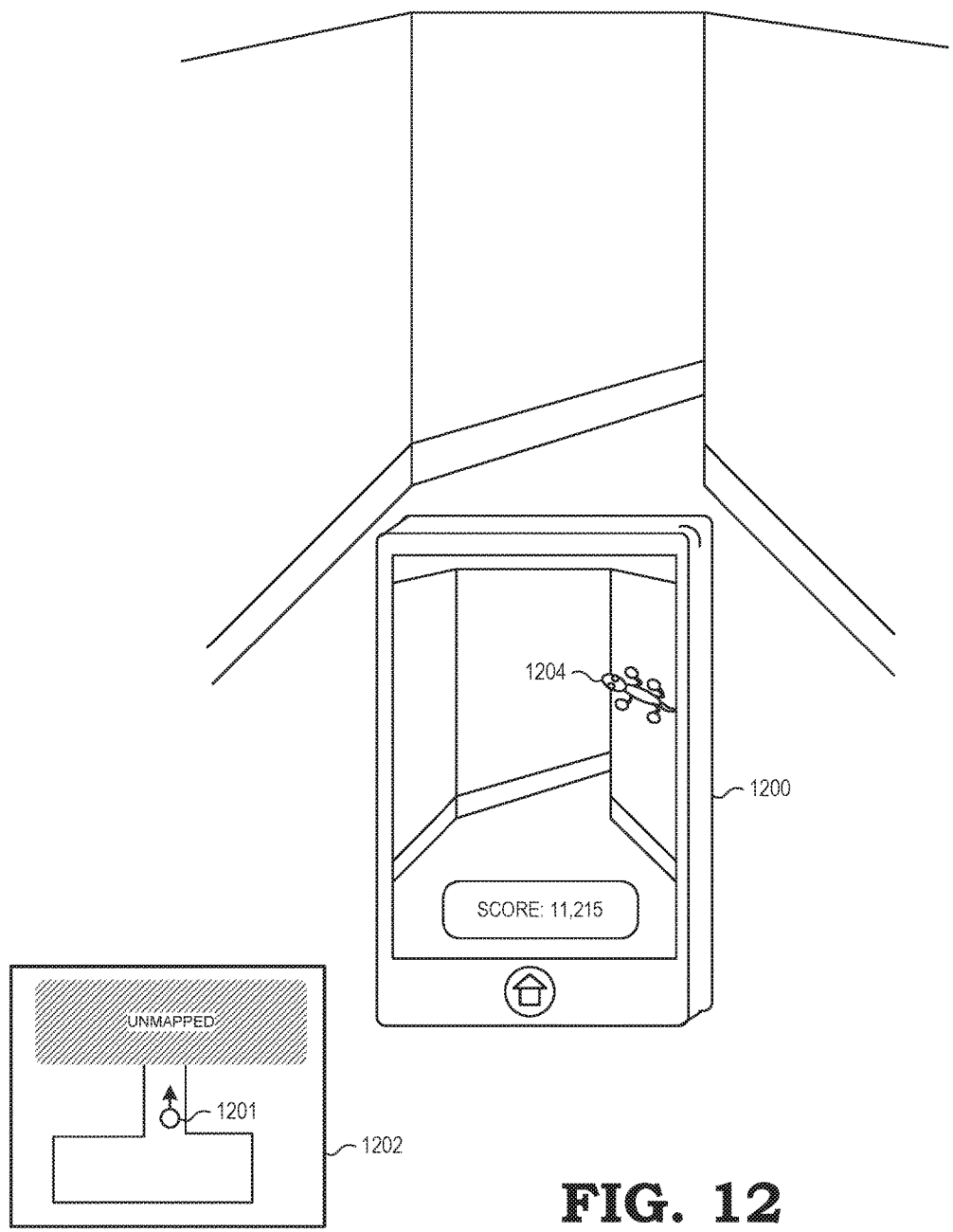
FIG. 12 is a diagram illustrating an example of an augmented reality overlay at an electronic device in which a user incentivized mapping game is depicted in accordance with at least one embodiment of the present disclosure.

FIG. 12 illustrates an example implementation of a location-based service that facilitates user-initiated mapping of previously unmapped spaces in accordance with at least one embodiment. Oftentimes, the 3D mapping database for a facility or location may be incomplete, in that one or more areas of the facility or location have not yet been mapped and incorporated into the 3D database of the facility or location. The entity managing the 3D mapping database typically addresses this lack of information by either accepting that the area will remain unmapped, or if it is sufficiently important to map the unmapped areas, commit the time and expense to send a mapping crew to the facility or location specifically to complete the mapping of the facility or location. However, rather than rely on a specialized mapping crew, the AR functionality and the position/orientation detection functionality of the electronic device can be leveraged to induce users of the electronic device to enter the unmapped areas and capture imagery, 3D mapping information, or both, via their electronic devices while in the unmapped areas. This captured information then may be supplied back to the entity for incorporation into its 3D mapping database.

In at least one embodiment, the user is induced to provide this service through the form of a game presented to the user via an AR overlay, in which the game displays some form of graphical information that induces the user to move into the unmapped area and manipulate the electronic device into different positions and orientations while in the unmapped area so that various sensor information of the unmapped area, such as imagery, depth information, ambient light, temperature, and the like, can be obtained for the unmapped area from different perspectives and locations.

To illustrate, FIG. 12 illustrates an example whereby a cloud service maintains a map 1202 of a facility, with the map 1202 indicating which areas of the facility have been mapped and which have not yet been mapped (with unmapped areas indicated by the hash-lined shading in the map 1202). The cloud service detects a position 1201 of an electronic device 1200 as being proximity to an unmapped area (e.g., through GPS coordinates provided by the electronic device 1200), and thus the cloud service invites the user of the electronic device 1200 to participate in a game. In this game, the user is challenged to track a virtual gecko 1204 that is depicted in an AR overlay for the imagery of the local environment captured and displayed by the electronic device 1200, whereby the virtual gecko 1204 is formatted so as to appear to travel over the walls, floors, and ceiling of the facility as viewed through the electronic device 1200. The cloud service determines the present orientation and position of the electronic device 1200 and determines the direction the user needs to travel to enter an unmapped area, and then controls the behavior of the virtual gecko 1204 so that the virtual gecko 1204 is depicted as travelling in the direction of the unmapped area and such that the user is induced to "follow" the virtual gecko 1204 toward the unmapped area. Once at the unmapped area, the virtual gecko 1204 may be controlled to travel to yet-unmapped locations, with the user and electronic device 1200 following, until the cloud service has obtained sufficient imagery and other sensor data from the electronic device 1200 to 3D map the unmapped area.

Any of a variety of techniques may be used to incentivize the user's participation in this game. For example, the challenge of appearing on a scoring leaderboard may sufficiently incentivize the user, with scoring handled by, for example, the percentage of time a user is able to maintain the virtual gecko 1204 within the view of the electronic device. Alternatively, financial incentives may be employed, such as by proportionally reducing the user's data plan bill based on the score attained by the user or the number of minutes the user plays the game, by offering coupons or other payment, and the like. In this manner, the entity maintaining the 3D database for the facility can efficiently and inexpensively complete the 3D mapping of the facility through the cooperation of users of electronic devices.

In addition to providing AR-based services that rely on the precise position/orientation information maintained by the electronic device using visual odometry, SLAM, and other techniques, the electronic device can provide location-based services that utilize virtual reality techniques. For these techniques, the position/orientation of the electronic device within a local environment may be equated to a corresponding position/orientation within a virtual environment or a remote environment, and thus the view of this other environment displayed at the electronic device may be controlled by the position/orientation of the electronic device within the local environment. Thus, the manner in which the user travels through a local environment and handles the electronic device in the local environment is reflected in the views of the remote/virtual environment displayed by the electronic device 100 to the viewer.

Figure 13:
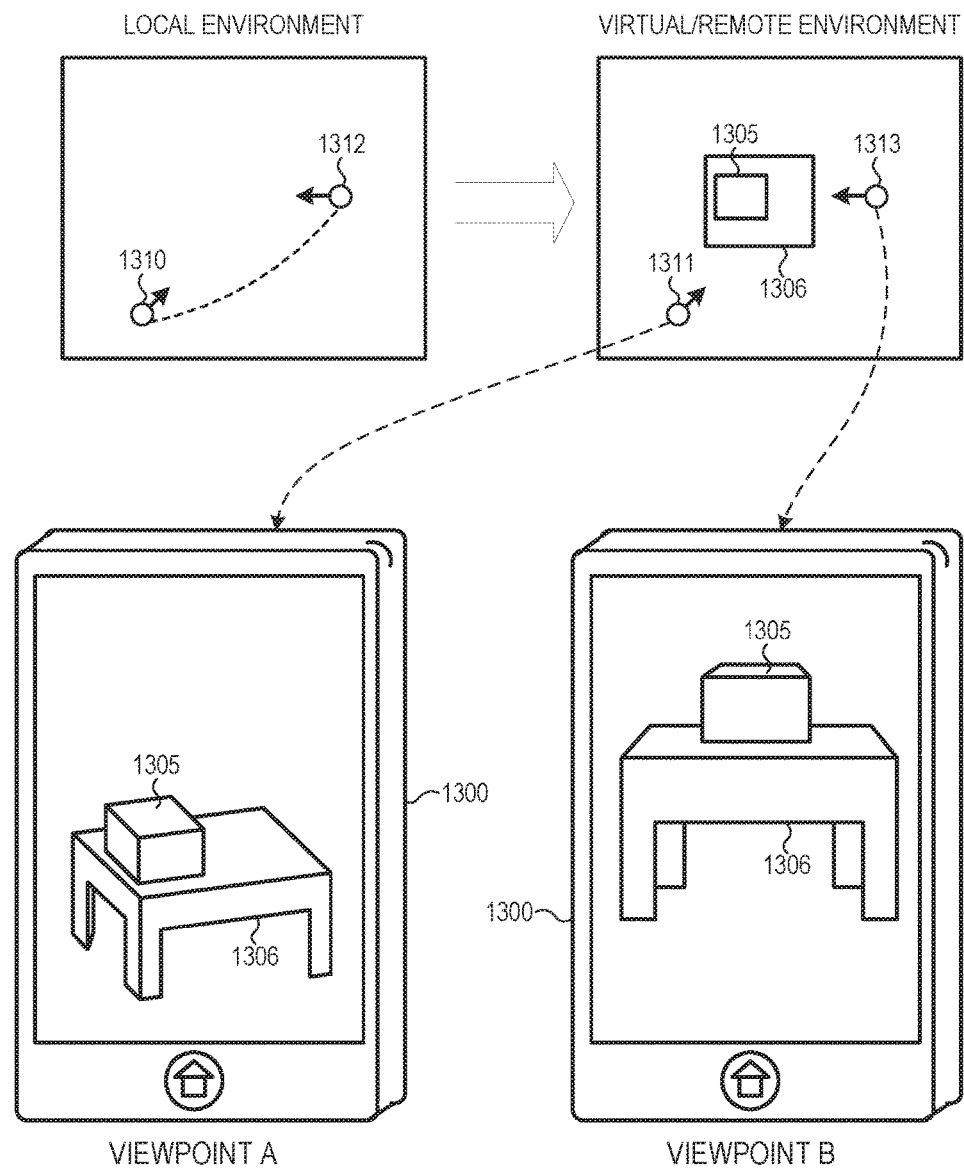
FIG. 13 is a diagram illustrating an example of a virtual reality display at an electronic device in which a remote environment or virtual environment is depicted based on movement of the electronic device in a local environment in accordance with at least one embodiment of the present disclosure.

To illustrate, FIG. 13 depicts an example VR-based service provided by an electronic device 1300 whereby a user can "walk" through a virtual/remote environment 1302 (as viewed through the electronic device 1300) by manipulating the position and orientation of the electronic device 1300 in a local environment 1304, whereby the imagery of the virtual/remote environment 1302 changes to reflect a changing viewpoint caused by changes in position/orientation of the electronic device 1300 in the local environment 1304. In this example, the virtual environment 1302 includes a box 1305 upon a table 1306. The user may view the box 1305 and table 1306 from various angles in the virtual environment 1302 by moving around the local environment 1304 in a corresponding manner. To illustrate, when the electronic device 1300 is at position/orientation 1310 in the local environment 1304, the electronic device 1300 determines the view of the box 1305 and table 1306 that would be presented to the user in the corresponding position/orientation 1311 in the virtual/remote environment 1302, and displays this view of the box 1305 and table 1306 in the manner depicted as "Viewpoint A" in FIG. 13. When the user moves so that the electronic device 1300 is at position/orientation 1312 in the local environment 1304, the electronic device 1300 determines the view of the box 1305 and table 1306 that would be presented to the user in the corresponding position/orientation 1313 in the virtual/remote environment 1302, and displays this view in the manner depicted as "Viewpoint B" in FIG. 13.

Using this technique, a user can traverse through a virtual/remote environment by performing corresponding actions in the local environment. Thus, this technique can be used to, for example, permit a user to walk through a movie scene recorded in 3D from multiple viewpoints, a sporting event likewise recorded in 3D from multiple viewpoints, walk through a simulation of a building or other facility, and the like. As another example, a restaurant can be 3D mapped and the resulting 3D map stored with a cloud service, and a patron of the restaurant wishing to make a reservation can access the 3D mapping and "walk around" the restaurant using this technique to ascertain the view of the restaurant from each table of the restaurant. The patron can then select the table that best suits the patron's taste, and contact the restaurant to reserve that table.

Much of the inventive functionality and many of the inventive principles described above are well suited for implementation with or in software programs or instructions and integrated circuits (ICs) such as application specific ICs (ASICs). It is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. Therefore, in the interest of brevity and minimization of any risk of obscuring the principles and concepts according to the present disclosure, further discussion of such software and ICs, if any, will be limited to the essentials with respect to the principles and concepts within the preferred embodiments.

In this document, relational terms such as first and second, and the like, may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element. The term "another", as used herein, is defined as at least a second or more. The terms "including" and/or "having", as used herein, are defined as comprising. The term "coupled", as used herein with reference to electro-optical technology, is defined as connected, although not necessarily directly, and not necessarily mechanically. The term "program", as used herein, is defined as a sequence of instructions designed for execution on a computer system. A "program", or "computer program", may include a subroutine, a function, a procedure, an object method, an object implementation, an executable application, an applet, a servlet, a source code, an object code, a shared library/dynamic load library and/or other sequence of instructions designed for execution on a computer system.

The specification and drawings should be considered as examples only, and the scope of the disclosure is accordingly intended to be limited only by the following claims and equivalents thereof. Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. The steps of the flowcharts depicted above can be in any order unless specified otherwise, and steps may be eliminated, repeated, and/or added, depending on the implementation. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

What is claimed is:

1. A method comprising:
   determining, at a mobile electronic device, a dimension of a physical object along an axis based on a change in position of the mobile electronic device when the mobile electronic device is moved from a first end of the physical object along the axis to a second end of the physical object along the axis, wherein determining the dimension of the physical object comprises:
   determining, using sensor data from at least one sensor of the mobile electronic device, a first position and a first orientation of the mobile electronic device at the first end of the physical object, the at least one sensor including at least one of an inertial sensor, a global positioning system (GPS) sensor, or an imaging camera;
   determining, using sensor data from the at least one sensor, a second position and a second orientation of the mobile electronic device at the second end of the physical object;
   determining, at a processor of the mobile electronic device, an offset based on a difference between the first orientation and the second orientation; and
   determining, at the processor of the mobile electronic device, the dimension of the physical object based on a distance between the first position and the second position and based on the offset.

2. The method of claim 1, wherein the at least one sensor comprises an inertial sensor.

3. The method of claim 1, wherein the at least one sensor comprises a global positioning system (GPS) sensor.

4. The method of claim 1, wherein:
   the at least one sensor comprises an imaging camera;
   determining the first position of the mobile electronic device comprises determining the first position of the mobile electronic device based at least in part on analysis of imagery captured by the imaging camera; and
   determining the second position of the mobile electronic device comprises determining the second position of the mobile electronic device based at least in part on analysis of imagery captured by the imaging camera.

5. The method of claim 1, further comprising:
   capturing, via an imaging camera of the mobile electronic device, at least one image of the physical object;
   identifying the physical object based on object recognition analysis of the at least one image and based on the dimension of the physical object; and
   querying a database based on an identification of the physical object to obtain at least one other dimension of the physical object from the database.

6. The method of claim 5, further comprising:
   displaying, at the mobile electronic device, at least one of the dimension and the at least one other dimension to a user.

7. The method of claim 6, further comprising:
   querying a database based on the identification of the physical object to display to a user of the mobile electronic device at least one of: warranty information for the physical object; product information for the physical object; user reviews for the physical object; and one or more prices offered for purchase of the physical object.

8. The method of claim 1, wherein the axis is defined by a first location of the mobile electronic device proximate to the first end of the physical object and a second location of the mobile electronic device proximate to the second end of the physical object.

9. A mobile electronic device comprising:
   at least one sensor, the at least one sensor including at least one of an inertial sensor, a global positioning system (GPS) sensor, or an imaging camera;
   a display; and
   a processor configured to determine a dimension of a physical object along an axis based on a change in position of the mobile electronic device when the mobile electronic device is moved from a first end of the physical object along the axis to a second end of the physical object along the axis, wherein the processor is configured to determine the dimension of the physical object by:
   determining, using sensor data from the at least one sensor, a first position and a first orientation of the mobile electronic device at the first end of the physical object, the at least one sensor including at least one of an inertial sensor, a global positioning system (GPS) sensor, or an imaging camera;
   determining, using sensor data from the at least one sensor, a second position and a second orientation of the mobile electronic device at the second end of the physical object;
   determining an offset based on a difference between the first orientation and the second orientation; and
   determining the dimension of the physical object based on a distance between the first position and the second position and based on the offset.

10. The mobile electronic device of claim 9, wherein the at least one sensor comprises an inertial sensor.

11. The mobile electronic device of claim 9, wherein the at least one sensor comprises a global positioning system (GPS) sensor.

12. The mobile electronic device of claim 9, wherein:
    the at least one sensor comprises an imaging camera;
    the processor is configured to determine the first position of the mobile electronic device by determining the first position of the mobile electronic device based at least in part on analysis of imagery captured by the imaging camera; and
    the processor is configured to determine the second position of the mobile electronic device by determining the second position of the mobile electronic device based at least in part on analysis of imagery captured by the imaging camera.

13. The mobile electronic device of claim 9, further comprising:
    at least one imaging camera; and
    wherein the processor further is configured to:
    capture, via the at least one imaging camera, at least one image of the physical object;
    identify the physical object based on object recognition analysis of the at least one image and based on the dimension of the physical object; and
    query a database based on an identification of the physical object to obtain at least one other dimension of the physical object from the database.

14. The mobile electronic device of claim 13, wherein the processor further is configured to:
    provide at least one of the dimension and the at least one other dimension to the display for display to a user.

15. The mobile electronic device of claim 14, wherein the processor further is configured to:
query a database based on the identification of the physical object to display to a user of the mobile electronic device at least one of: warranty information for the physical object; product information for the physical object; user reviews for the physical object; and one or more prices offered for purchase of the physical object.

16. The mobile electronic device of claim 9, wherein the axis is defined by a first location of the mobile electronic device proximate to the first end of the physical object and a second location of the mobile electronic device proximate to the second end of the physical object.

17. A method comprising:
capturing and displaying imagery of a physical object at a mobile electronic device using an imaging camera of the mobile electronic device;
determining, at a processor of the mobile electronic device, a three-dimensional mapping of the physical object;
identifying at least two points of the physical object by detecting at least two user contact points at a touchscreen of the mobile electronic device, each user contact point corresponding to, and identifying, a corresponding point of the at least two points of the physical object in the displayed imagery; and
determining, at the processor of the mobile electronic device, at least one dimensional aspect of the physical object based on the at least two points of the physical object using the three-dimensional mapping of the physical object.

18. The method of claim 16, further comprising:
determining the three-dimensional mapping at the mobile electronic device using a depth sensor of the mobile electronic device.

19. The method of claim 16, further comprising:
accessing, at the mobile electronic device, a computer aided design (CAD) model of the physical object based on the three-dimensional mapping of the physical object; and
wherein determining the at least one dimensional aspect of the physical object comprises determining the at least one dimensional aspect of the physical object using the CAD model.

20. The method of claim 16, wherein the at least one dimensional aspect includes a dimension between two points of the at least two points of the physical object.

21. The method of claim 16, wherein:
the at least two points of the physical object comprises three points of the physical object in the displayed imagery; and
the at least one dimensional aspect includes at least one of: an area of the physical object defined by the three points; or an angle of the physical object defined by the three points.

22. The method of claim 16, further comprising:
displaying information about the at least one dimensional aspect of the physical object as an augmented reality overlay for the displayed imagery.

23. A mobile electronic device comprising:
at least one imaging camera;
a display;
a touchscreen; and
a processor configured to:
capture, via the at least one imaging camera, imagery of a physical object and display the imagery to a user via the display;
determine a three-dimensional mapping of the physical object;
identify at least two points of the physical object by detecting at least two user contact points at the touchscreen, each user contact point corresponding to, and identifying, a corresponding point of the at least two points of the physical object in the displayed imagery; and
determine at least one dimensional aspect of the physical object based on the at least two points of the physical object using the three-dimensional mapping of the physical object.

24. The mobile electronic device of claim 23, further comprising:
a depth sensor; and
wherein the processor is to determine the three-dimensional mapping using the depth sensor.

25. The mobile electronic device of claim 23, wherein:
the processor is configured to access a computer aided design (CAD) model of the physical object based on the three-dimensional mapping of the physical object and to determine the at least one dimensional aspect of the physical object using the CAD model.

26. The mobile electronic device of claim 23, wherein the at least one dimensional aspect includes a dimension between two points of the at least two points of the physical object.

27. The mobile electronic device of claim 23, wherein:
the at least two points of the physical object comprises three points of the physical object in the displayed imagery; and
the at least one dimensional aspect includes at least one of: an area of the physical object defined by the three points; or an angle of the physical object defined by the three points.

28. The mobile electronic device of claim 23, wherein:
the processor is further configured to display information about the at least one dimensional aspect of the physical object at the display as an augmented reality overlay for the displayed imagery.

* * * * *